US012217712B2

(12) United States Patent
Chen et al.

(10) Patent No.: US 12,217,712 B2
(45) Date of Patent: Feb. 4, 2025

(54) METHOD FOR DRIVING PIXEL ARRAY, DEVICE, AND DISPLAY PANEL

(71) Applicants: FUZHOU BOE OPTOELECTRONICS TECHNOLOGY CO., LTD., Fuzhou (CN); BOE TECHNOLOGY GROUP CO., LTD., Beijing (CN)

(72) Inventors: Meizhen Chen, Beijing (CN); Kai Diao, Beijing (CN); Qingna Hou, Beijing (CN); Xin Chen, Beijing (CN); Hongzhou Xie, Beijing (CN); Ying Tian, Beijing (CN); Renhui Yu, Beijing (CN); Xiaoyang Liu, Beijing (CN); Shulian Lin, Beijing (CN)

(73) Assignees: FUZHOU BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/922,021

(22) PCT Filed: Nov. 26, 2021

(86) PCT No.: PCT/CN2021/133725

§ 371 (c)(1),
(2) Date: Oct. 28, 2022

(87) PCT Pub. No.: WO2023/092506

PCT Pub. Date: Jun. 1, 2023

(65) Prior Publication Data

US 2024/0221695 A1 Jul. 4, 2024

(51) Int. Cl.
*G09G 3/36* (2006.01)

(52) U.S. Cl.
CPC ....... *G09G 3/36* (2013.01); *G09G 2300/0439* (2013.01); *G09G 2310/0262* (2013.01); *G09G 2310/08* (2013.01); *G09G 2320/02* (2013.01)

(58) Field of Classification Search
CPC ............. G09G 3/36; G09G 2300/0439; G09G 2310/0262; G09G 2310/08; G09G 2320/02
See application file for complete search history.

(56) References Cited

U.S. PATENT DOCUMENTS

2003/0218586 A1* 11/2003 Wu ...................... G09G 3/3648 345/87
2008/0012806 A1* 1/2008 Takeuchi ............. G09G 3/3666 345/55

(Continued)

*Primary Examiner* — Ariel A Balaoing
(74) *Attorney, Agent, or Firm* — Dilworth & Barrese, LLP.; Michael J. Musella, Esq.

(57) ABSTRACT

A method for driving a pixel array, a device, and a display panel are provided. The data lines electrically connected to the sub-pixels are electrically connected with data signal terminals through switch modules, respectively. The switch modules receive selection control signals to switch connection states of the data lines with the data signal terminals. The method includes: applying gate signals to a gate line corresponding to the first row of sub-pixels and a gate line corresponding to the second row of sub-pixels, respectively; and during a period of applying the gate signals to the second row of sub-pixels to control the second row of sub-pixels, after a first duration length of the gate signals applied to the first row of sub-pixels being switched from the on-state to the off-state, a selection control signal corresponding to the second row of sub-pixels controlling the switch modules to switch the connection states.

16 Claims, 9 Drawing Sheets

(56) References Cited

U.S. PATENT DOCUMENTS

| | | | | |
|---|---|---|---|---|
| 2014/0176406 | A1* | 6/2014 | Guo | G09G 3/3688<br>345/87 |
| 2021/0193069 | A1* | 6/2021 | Li | G09G 3/3648 |
| 2022/0122523 | A1* | 4/2022 | Hu | H01L 27/124 |
| 2022/0277703 | A1* | 9/2022 | Xing | G02F 1/1368 |
| 2022/0366837 | A1* | 11/2022 | Zou | G09G 3/006 |

* cited by examiner

METHOD FOR DRIVING PIXEL ARRAY, DEVICE, AND DISPLAY PANEL

TECHNICAL FIELD

Embodiments of the present disclosure relate to a method for driving a pixel array, a device, and a display panel.

BACKGROUND

In the field of display technology, for example, a pixel array of a liquid crystal display panel usually includes a plurality of rows of gate lines and a plurality of columns of data lines, and the data lines are interlaced with the gate lines. The gate lines may be driven by an integrated driving circuit. In recent years, with the continuous improvement of the preparation process of amorphous silicon thin film transistors or oxide thin film transistors, a gate driving circuit may also be directly integrated on a thin film transistor array substrate to prepare gate driver on array (GOA) which serves as a gate driving circuit to drive the gate lines. GOA technology helps to realize a narrow frame design of a display panel, and GOA technology can reduce the production cost of the display panel.

SUMMARY

At least one embodiment of the present disclosure provides a method for driving a pixel array. The pixel array comprises sub-pixels in a plurality of rows and columns, a plurality of gate lines and a plurality of data lines intersect to define the sub-pixels in the plurality of rows and columns. The data lines electrically connected to the sub-pixels are electrically connected with data signal terminals through switch modules, respectively, and the switch modules receive selection control signals to switch connection states of the data lines with the data signal terminals. Sub-pixels in the plurality of rows comprise a first row of sub-pixels and a second row of sub-pixels, the first row is adjacent to the second row. The method comprises: applying gate signals to a gate line corresponding to the first row of sub-pixels and a gate line corresponding to the second row of sub-pixels, respectively, the gate signals comprising an on-state and an off-state; and during a period of applying the gate signals to the second row of sub-pixels to control the second row of sub-pixels, after a first duration length of the gate signals applied to the first row of sub-pixels being switched from the on-state to the off-state, a selection control signal corresponding to the second row of sub-pixels controlling the switch modules to switch the connection states. The first duration length is greater than 0.

For example, in the method provided by an embodiment of the present disclosure, each row of sub-pixels is divided into a plurality of sub-pixel groups, a plurality of data lines electrically connected with a plurality of sub-pixels in each sub-pixel group are electrically connected with one data signal terminal through switch modules, respectively, and a switch module corresponding to each sub-pixel comprises a plurality of switching elements, the selection control signal comprises a plurality of selection control signals, and the plurality of switching elements receive the plurality of selection control signals, respectively, so as to switch connection states of the plurality of data lines correspondingly connected with the plurality of switching elements and the data signal terminal.

For example, in the method provided by an embodiment of the present disclosure, each sub-pixel group comprises a first sub-pixel and a second sub-pixel, a data line connected with the first sub-pixel is connected with the data signal terminal through a first switching element, and a data line connected with the second sub-pixel is connected with the data signal terminal through a second switching element, the plurality of selection control signals comprise a first selection control signal and a second selection control signal. During the period of applying the gate signals to the second row of sub-pixels to control the second row of sub-pixels, the first selection control signal and the second selection control signal are applied to the first switching element and the second switching element corresponding to each sub-pixel group in the second row of sub-pixels, respectively, so that the first switching element and the second switching element are turned on.

For example, in the method provided by an embodiment of the present disclosure, there is a second duration length between a moment of the first selection control signal controlling the first switching element to switch from turn-on to turn-off and a moment of the second selection control signal controlling the second switching element to turn on, and the second duration length is greater than 0.

For example, in the method provided by an embodiment of the present disclosure, two sub-pixels separated by one column of sub-pixel in each row of sub-pixels are designated as the first sub-pixel and the second sub-pixel, respectively, so that the first sub-pixel and the second sub-pixel form one sub-pixel group.

For example, in the method provided by an embodiment of the present disclosure, a value range of a ratio of the first duration length to the second duration length is [0.8, 3.0].

For example, in the method provided by an embodiment of the present disclosure, the second duration length is determined according to a duration length required for the data signal terminal to switch from a first data signal to a second data signal, a duration length required for the first switching element to switch from turn-on to turn-off, and a duration length required for the second switching element to switch from turn-off to turn-on.

For example, in the method provided by an embodiment of the present disclosure, each sub-pixel group comprises N sub-pixels, and N is an integer greater than or equal to 2, the gate signals are periodic signals, and the switch modules are controlled to switch the connection states by the selection control signals corresponding to the second row of sub-pixels within a third duration length during which the gate signals are in the on-state in each cycle, and a formula for calculating a pulse width of the selection control signal is: $W=(T3-T1-(N-1)\times T2)/N$, where W represents the pulse width, T3 represents the third duration length, T1 represents the first duration length, and T2 represents the second duration length.

For example, in the method provided by an embodiment of the present disclosure, a value range of a ratio of the third duration length T3 to the first duration length T1 is [1.0, 5.0].

For example, in the method provided by an embodiment of the present disclosure, a value range of a ratio of the second duration length T2 to the pulse width is [0.3, 2.0].

For example, in the method provided by an embodiment of the present disclosure, a value range of a ratio of the first duration length T1 to the pulse width is [0.7, 3.0].

For example, in the method provided by an embodiment of the present disclosure, the first duration length is positively related to a length of a connecting line of the first row of sub-pixels, and the connecting line is configured to connect a signal source of the gate signals with a receiving terminal of the gate line corresponding to each row of sub-pixels.

For example, the method provided by an embodiment of the present disclosure further comprises: determining the first duration length corresponding to a longest connecting line among a plurality of connecting lines of the first row of sub-pixels; and according to the first duration length corresponding to the longest connecting line, determining first duration lengths corresponding to other connecting lines except the longest connecting line among the plurality of connecting lines.

For example, the method provided by an embodiment of the present disclosure further comprises: dividing the pixel array into a plurality of areas, where each area comprises a plurality of consecutive rows of sub-pixels. Determining the first duration length corresponding to the longest connecting line among the plurality of connecting lines of the first row of sub-pixels comprises: determining a far-end area farthest from the signal source of the gate signals from the plurality of areas; and determining the first duration length corresponding to the longest connecting line based on the connecting lines corresponding to the first row of sub-pixels in the far-end area. According to the first duration length corresponding to the longest connecting line, determining the first duration lengths corresponding to other connecting lines except the longest connecting line among the plurality of connecting lines comprises: according to the first duration length corresponding to the longest connecting line, determining one first duration length for the plurality rows of sub-pixels in each area.

At least one embodiment of the present disclosure further provides a display panel. The display panel comprises a pixel array formed by sub-pixels in a plurality of rows and columns, a plurality of gate lines and a plurality of data lines intersect to define the sub-pixels in the plurality of rows and columns, the data lines electrically connected to the sub-pixels are electrically connected with data signal terminals through switch modules, and the switch modules receive selection control signals to switch connection states of the data lines with the data signal terminals, sub-pixels in the plurality of rows comprise a first row of sub-pixels and a second row of sub-pixels, the first row is adjacent to the second row. The first row of sub-pixels and the second row of sub-pixels receive gate signals from a gate line corresponding the first row of sub-pixels and a gate line corresponding to the second row of sub-pixels, respectively, and the gate signals comprises an on-state and an off-state; and during a period of applying the gate signals to the second row of sub-pixels to control the second row of sub-pixels, after a first duration length of the gate signals received by the first row of sub-pixels switching from the on-state to the off-state, the switch modules of the second row of sub-pixels receive a selection control signal to control the switch modules of the second row of sub-pixels to switch the connection states.

For example, in the display panel provided by an embodiment of the present disclosure, each row of sub-pixels is divided into a plurality of sub-pixel groups, a plurality of data lines electrically connected with a plurality of sub-pixels in each sub-pixel group are electrically connected with one data signal terminal through switch modules, respectively, and a switch module corresponding to each sub-pixel comprises a plurality of switching elements, the selection control signal comprises a plurality of selection control signals, and the plurality of switching elements receive the plurality of selection control signals, respectively, so as to switch connection states of the plurality of data lines correspondingly connected with the plurality of switching elements and the data signal terminal.

For example, in the display panel provided by an embodiment of the present disclosure, each sub-pixel group comprises a first sub-pixel and a second sub-pixel, a data line connected with the first sub-pixel is connected with the data signal terminal through a first switching element, and a data line connected with the second sub-pixel is connected with the data signal terminal through a second switching element, and the plurality of selection control signals comprise a first selection control signal and a second selection control signal; and during the period of the second row of sub-pixels receiving the gate signals, the first switching element and the second switching element corresponding to each sub-pixel group in the second row of sub-pixels are turned on in response to the first selection control signal and the second selection control signal, respectively.

For example, in the display panel provided by an embodiment of the present disclosure, there is a second duration length between a moment when the first switching element is switched from turn-on to turn-off and a moment when the second switching element is turned on, and the second duration length is greater than 0.

For example, in the display panel provided by an embodiment of the present disclosure, the display panel comprises a non-display area and a display area, the pixel array is in the display area, and the non-display area comprises a signal source of the gate signals.

At least one embodiment of the present disclosure further provides a pixel array driving device. The pixel array comprises sub-pixels in a plurality of rows and columns, a plurality of gate lines and a plurality of data lines intersect to define the sub-pixels in the plurality of rows and columns, the data lines electrically connected to the sub-pixels are electrically connected with data signal terminals through switch modules, respectively, and the switch modules receive selection control signals to switch connection states of the data lines with the data signal terminals, sub-pixels in the plurality of rows comprise a first row of sub-pixels and a second row of sub-pixels, the first row is adjacent to the second row. The driving device comprises: a gate driving circuit, configured to apply gate signals to a gate line corresponding to the first row of sub-pixels and a gate line corresponding to the second row of sub-pixels, respectively, the gate signals comprising an on-state and an off-state; a control circuit, configured to apply selection control signals to the second row of sub-pixels, where during a period of applying the gate signals to the second row of sub-pixels to control the second row of sub-pixels, after a first duration length of the gate signals applied to the first row of sub-pixels being switched from the on-state to the off-state, a selection control signal corresponding to the second row of sub-pixels controls the switch modules to switch the connection states; and a data driving circuit, comprising the data signal terminals, configured to provide data signals to the data lines connected to the data signal terminals. The first duration length is greater than 0.

BRIEF DESCRIPTION OF THE DRAWINGS

In order to clearly illustrate the technical solutions of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," "the," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

For example, GOA can be used to provide gate signals (scanning signals) for a plurality of gate lines of a pixel array, so as to control sequential opening of sub-pixels in a plurality of rows, and at the same time, data lines provide data signals to sub-pixels in corresponding rows in the pixel array, so as to form gray level voltages required for displaying images in each sub-pixel, thereby displaying a frame of image. At present, display panels increasingly use GOA technology to prepare gate driving circuit, so as to drive the gate lines.

Figure 1A:
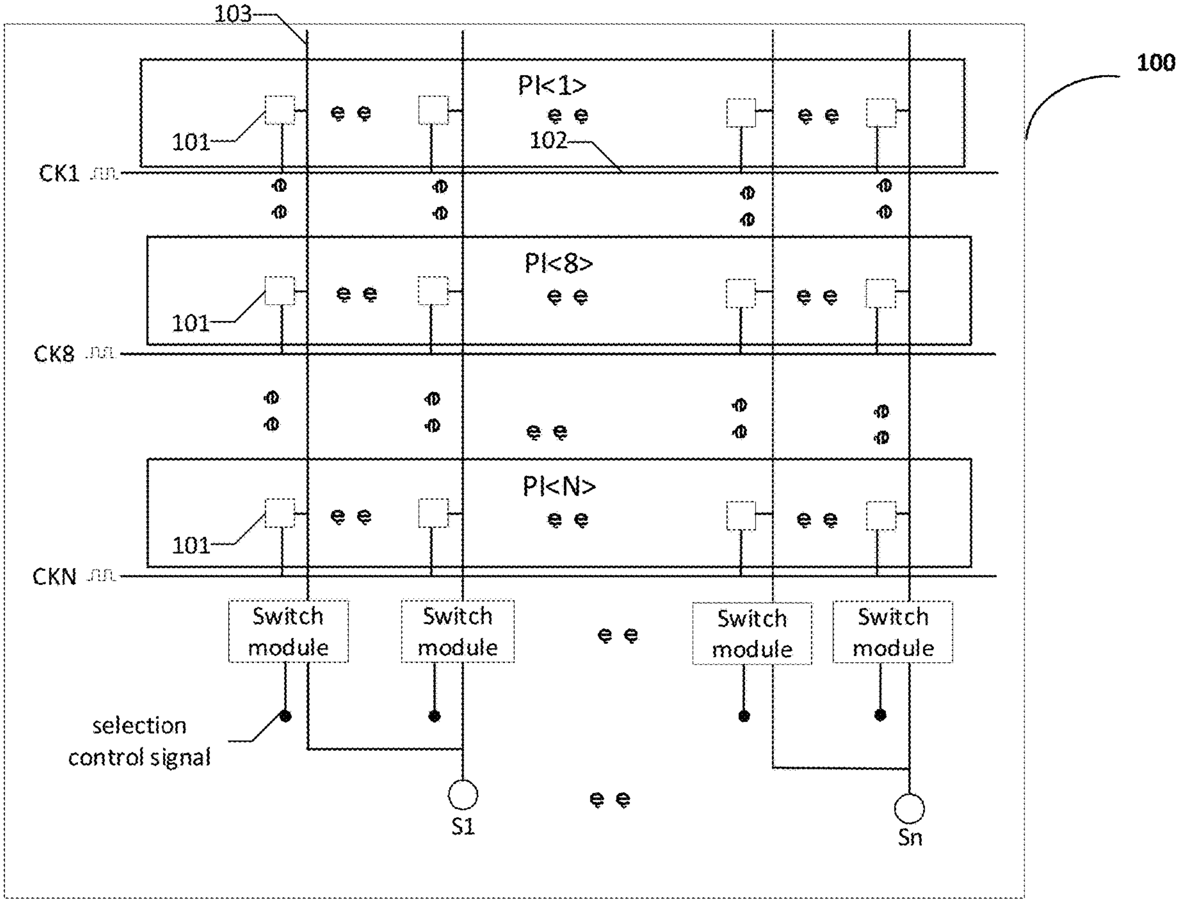
FIG. 1A illustrates a schematic diagram of a display panel.

FIG. 1A illustrates a schematic diagram of a display panel 100.

As illustrated in FIG. 1A, the display panel 100 includes sub-pixels 101 in a plurality of rows and columns that are arranged in an array. For example, sub-pixels in each row are connected with the same gate line 102 to receive a gate signal, and sub-pixels in each column are connected with the same data line 103. Thus, a plurality of gate lines and a plurality of data lines intersect to define the sub-pixels in the plurality of rows and columns. In this disclosure, the sub-pixels connected with the same gate line are regarded as a same row of sub-pixels, the same row of sub-pixels may be arranged in the same row or not in the same row. Similarly, the sub-pixels connected with the same data line are regarded as a same column of sub-pixels, the same column of sub-pixels may be arranged in the same column or not in the same column. The embodiments of the present disclosure are further applicable to a double-gate structure, that is, two gate lines are provided between two adjacent rows of sub-pixels, and one row of sub-pixels is controlled by two gate lines, which are not limited here.

The display panel 100 may be, for example, a liquid crystal display panel or an OLED display panel. For example, the display panel is the liquid crystal display panel, which includes an array substrate and an opposed substrate, and a liquid crystal layer is sandwiched between the array substrate and the opposed substrate. Gate lines, data lines, sub-pixels and the like are formed on the array substrate. A sub-pixel includes a pixel electrode, a switching element, etc. The switching element of a pixel unit is coupled with a corresponding gate line and a corresponding data line, so as to receive gate signal and data signal provided by the gate line and data line.

As illustrated in FIG. 1A, the data lines electrically connected to the sub-pixels are electrically connected to a plurality of data signal terminals (S1, . . . , Sn) through a plurality of switch modules. The plurality of switch modules may be in one-to-one correspondence with the plurality of data signal terminals, or k (integer greater than 0) switch modules may correspond to one data signal terminal. Each switch module receives one selection control signal to switch the connection state between the data line and the data signal terminal. For example, sub-pixels in each column are connected to a same switch module, and the connection state of the sub-pixels in the column and the data signal terminal is controlled by the same switch module.

For example, in the case where the selection control signal is at a high level, the switch module controls the data line to be connected with the data signal terminal; in the case where the selection control signal is at a low level, the switch module controls the data line to be disconnected from the data signal terminal.

A gate signal includes an on-state and an off-state. In the case where the gate signal of a row of sub-pixels is in an on-state and the switch module of the row of sub-pixels controls that the data lines respectively connected with a plurality of sub-pixels are connected with the data signal terminal, the data signal terminal charges the plurality of sub-pixels to write the data signal of the data signal terminal to the plurality of sub-pixels.

For example, as illustrated in FIG. 1A, the pixel array includes N rows, where N is an integer greater than 1. The sub-pixels in the row PI<1> receive a gate signal CK1, the sub-pixels in the row PI<2> receive a gate signal CK2, . . . , and the sub-pixels in the row PI<N> receive a gate signal CKN. It should be noted that the amount of rows of sub-pixels included in the display panel can be set as required.

In some embodiments of the present disclosure, for example, 8 gate signals form one cycle group to apply gate signals to each row of sub-pixels in the pixel array. It should be understood that although the embodiments of the present disclosure are described by taking the case that 8 gate signals form one cycle group as an example, the present disclosure does not limit the amount of gate signals in one cycle group, for example, 6 or 12 gate signals may be used as one cycle group.

Figure 1B:
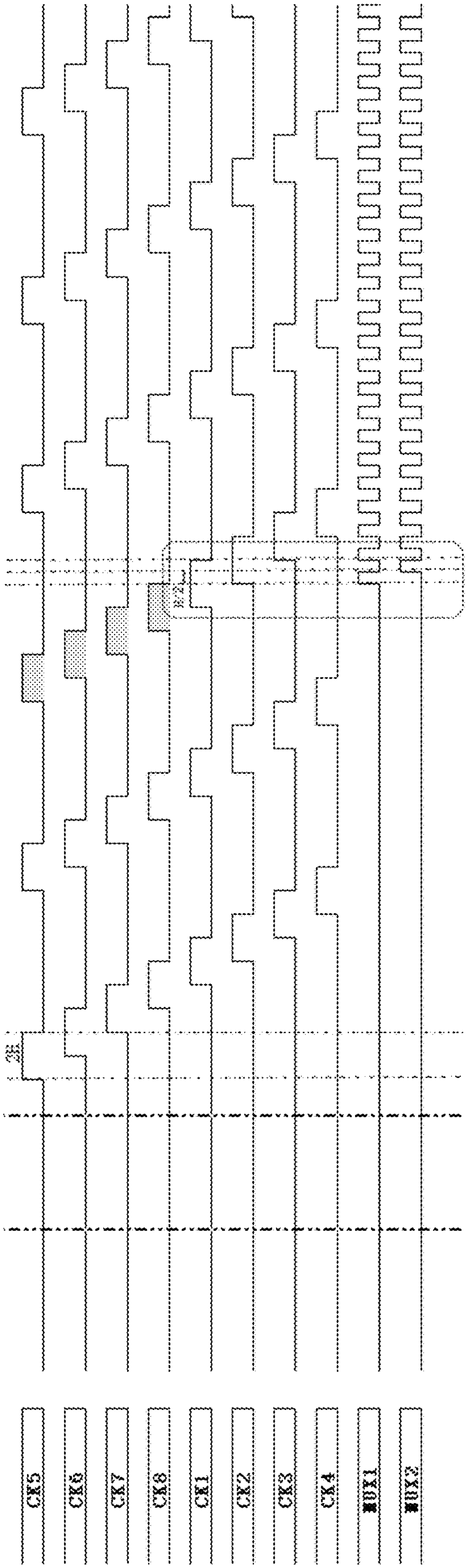
FIG. 1B illustrates a schematic diagram of a timing relationship of a cycle group.

FIG. 1B illustrates a schematic diagram of a timing relationship of one cycle group.

As illustrated in FIG. 1B, the eight gate signals are CK1, CK2, CK3, CK4, CK5, CLK6, CK7 and CK8, which correspond to different clock signals applied to the gate driving circuit.

For example, a duty ratio of the gate signal CK1 to the gate signal CK8 (that is, the ratio of a duration of a high level to a period) is 25% and the periods of the gate signal CK1 to the gate signal CK8 are the same. For example, for each gate signal of CK1 to CK8, a duration of high level is 2H and a duration of low level is 6H. H is a length of the duration required for charging one row of sub-pixels.

As illustrated in FIG. 1B, for example, for one time period, the high-level duration of the gate signal is 2H. In the first 1H duration, the sub-pixels of the row corresponding to the gate signal are pre-charged. In the last 1H duration, in the two adjacent rows of sub-pixels, the overlapping part between the time when the gate signal of the first row of sub-pixels is turned on and the time when the gate signal of the second row of sub-pixels is turned on is the process of pre-charging for the second row of sub-pixels, and the non-overlapping part between the time when the gate signal of the first row of sub-pixels is turned on and the time when the gate signal of the second row of sub-pixels is turned on is the actual charging duration of the second row of sub-pixels, that is, in the last 1H duration, the data signal terminal charges the sub-pixels in a corresponding row of the gate signal to write the data signal to the sub-pixels in the corresponding row. During a first (½) H duration in the last 1H duration, a selection control signal MUX1 controls the data lines of the first part sub-pixels in a row of sub-pixels to be connected with the data signal terminal, so that the data signal terminal charges the first part sub-pixels. During a last (½) H duration in the last 1H duration, the selection control signal MUX2 controls the data lines of the second part sub-pixels in the row of sub-pixels to be connected with the data signal terminal, so that the data signal terminal charges the second part sub-pixels. With this design, it is possible to charge one row of pixels at least in two parts, and it can ensure the pixel charging rate for large-size products.

As illustrated in FIG. 1B, for example, when the gate signal CK1 is converted from high level to low level, the selection control signal MUX1 corresponding to the next row of gate signal CK2 is also immediately turned on and switched to high level to charge the first part sub-pixels in the second row of sub-pixels, and the holding time is H/2. When the selection control signal MUX1 is switched to low level, the selection control signal MUX2 is also synchronously switched to high level, and the holding time is H/2, so as to charge the second part sub-pixels in the second row of sub-pixels, and then the selection control signal MUX2 is switched to low level.

However, due to the GOA characteristics of large-size display panels and the limitations of wiring, the delay of resistance and capacitance is large. For the first row of sub-pixels and the second row of sub-pixels that are adjacent to charging, when gates of the first row of sub-pixels are turned on, when the gate signal of the first row of sub-pixels is switched from high level to low level, for example, due to the influence of resistance and capacitance impedance, the gate signal is delayed to be turned off, and the gate signal cannot be switched immediately. When charging the second row of sub-pixels, because the first row of sub-pixels is not completely closed, the data signal of the second row of sub-pixels charges the first row of sub-pixels, resulting in problems such as pixel mischarge, thereby causing abnormal display of black and white frames, jagged frames, etc.

Figure 1C:
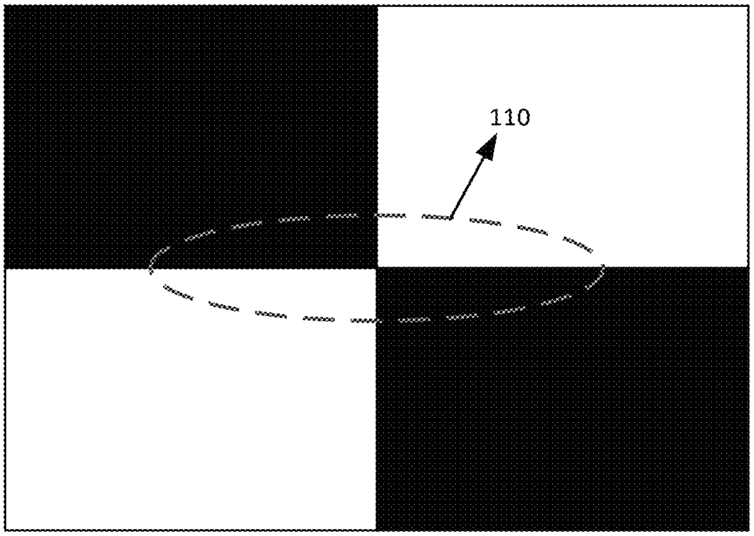
FIG. 1C and FIG. 1D illustrate schematic diagrams of pixel mischarge in a display image provided by at least one embodiment of the present disclosure.
Figure 1D:
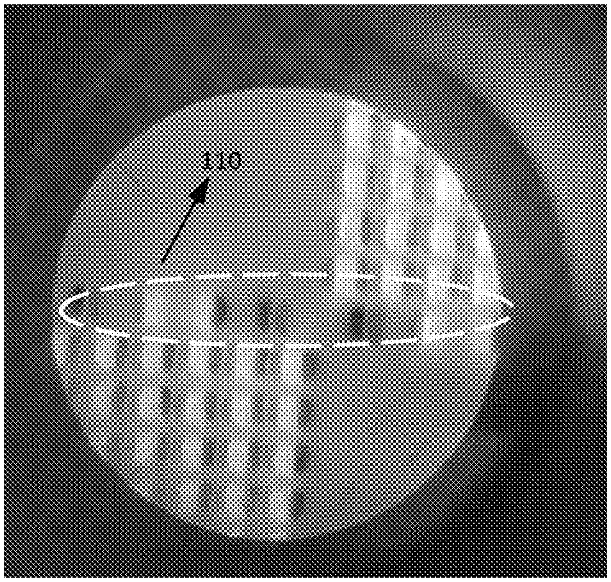

FIG. 1C and FIG. 1D illustrate schematic diagrams of pixel mischarge in a display image provided by at least one embodiment of the present disclosure.

FIG. 1C illustrates a next frame of display image (i.e., the second frame of display image) of two adjacent frames of display images displayed in sequence in the pixel array. FIG. 1D illustrates a real eyepiece picture of the second frame of display image illustrated in FIG. 1C.

As illustrated in FIG. 1C, in the second frame of display image, pixel 1 is black, pixel 2 is white, pixel 3 is white, and pixel 4 is black. In the display image of a previous frame of the second frame display image (that is, the first frame of display image), the pixel 1 is white, the pixel 2 is black, the pixel 3 is black, and the pixel 4 is white.

When the display image displayed by the pixel array is switched from the first frame of display image to the second frame of display image, as illustrated in FIG. 1D, the m-th row sub-pixels 110 of the second frame display image is wrongly charged, thereby illustrating a jagged shape. The area circled by the oval dotted line in FIG. 1C and FIG. 1D is the area where the m-th row sub-pixels 110 is located. The pixel mischarge of the second frame display image is due to that the data signal terminal writes data to the (m+1)-th row when at least part sub-pixels in the m-th row are not closed, resulting in the data signal of the (m+1)-th row being written to the m-th row. Since part of sub-pixels in the m-th row have been turned off, while the other part of sub-pixels has not been turned off, the pixels in the m-th row are displayed as jagged shape in the second frame of display image.

For this reason, at least one embodiment of the present disclosure provides a method for driving the pixel array. The driving method includes: applying gate signals to a gate line corresponding to the first row of sub-pixels and a gate line corresponding to the second row of sub-pixels, respectively, where the gate signals comprise an on-state and an off-state, and a first row of sub-pixels and a second row of sub-pixels are sub-pixels in two adjacent rows; and during a period of applying the gate signals to the second row of sub-pixels to control the second row of sub-pixels, after a first duration length of the gate signals applied to the first row of sub-pixels being switched from the on-state to the off-state, applying a selection control signal corresponding to the second row of sub-pixels, where the first duration length is greater than 0. This method can alleviate the problems of pixel mischarge and abnormal image display caused by the first row of sub-pixels not being completely closed.

Figure 2A:
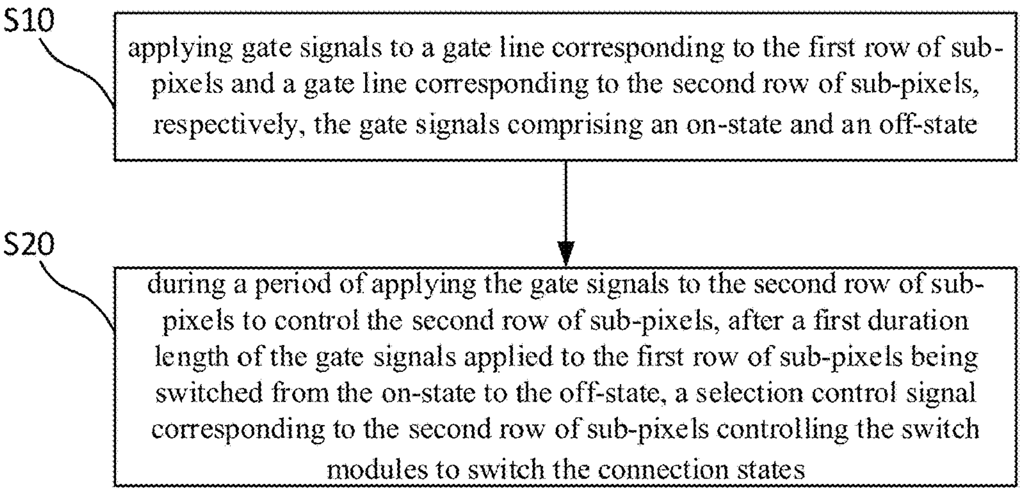
FIG. 2A illustrates a flow chart of a method for driving a pixel array provided by at least one embodiment of the present disclosure.

FIG. 2A illustrates a flow chart of a method for driving a pixel array provided by at least one embodiment of the present disclosure.

As illustrated in FIG. 2A, the method may include steps S10 to S20.

Step S10: applying gate signals to a gate line corresponding to the first row of sub-pixels and a gate line corresponding to the second row of sub-pixels, respectively, the gate signals comprising an on-state and an off-state.

Step S20: during a period of applying the gate signals to the second row of sub-pixels to control the second row of sub-pixels, after a first duration length of the gate signals applied to the first row of sub-pixels being switched from the on-state to the off-state, a selection control signal corresponding to the second row of sub-pixels controlling the switch modules to switch the connection states.

The driving method provided by at least one embodiment of the present disclosure may be applied to the pixel array illustrated in FIG. 1A. The pixel array includes sub-pixels in a plurality of rows and columns, a plurality of gate lines and a plurality of data lines intersect to define the sub-pixels in the plurality of rows and columns, the data lines electrically connected to the sub-pixels are electrically connected with data signal terminals through switch modules, respectively, and the switch modules receive selection control signals to switch connection states of the data lines with the data signal terminals. For the embodiment of the pixel array, reference can be made to the above-mentioned description of FIG. 1A.

Here, sub-pixels in the plurality of rows comprise a first row of sub-pixels and a second row of sub-pixels, and the first row is adjacent to the second row, that is, the first row of sub-pixels and the second row of sub-pixels may be any two adjacent rows of sub-pixels. It should be understood that in at least one embodiment of the present disclosure, two adjacent rows of sub-pixels do not refer to two adjacent rows of sub-pixels on the layout of the pixel array, but refer to the gate signals of the two rows of sub-pixels are adjacent on the timing. For example, two rows of sub-pixels adjacent in timing refer to two rows of sub-pixels with a difference of one time-unit between gate signals, and one time-unit may be the length of duration for charging one row of sub-pixels. For example, in the scenario illustrated in FIG. 1A and FIG. 1B, the difference of the gate signals of PI<1> and PI<2> is 1H, thus PI<1> is the first row of sub-pixels, and PI<2> is the second row of sub-pixels adjacent to PI<1>. Similarly, PI<3> is the first row of sub-pixels, and PI<4> is the second row of sub-pixels adjacent to PI<3>. Similarly, in one scenario, if the gate signal of PI<11> is delayed by 1H compared with the gate signal of PI<8>, then PI<8> and PI<11> may be two adjacent rows of sub-pixels, that is, the first row of sub-pixels is PI<11>, and the second row of sub-pixels is PI<8>.

It should be noted that in this disclosure, except for the last row of sub-pixels in the pixel array, the sub-pixels in other rows may be the first row of sub-pixels; except for the first row of sub-pixels in the pixel array, the sub-pixels in other rows may be the second row of sub-pixels.

For step S10, for example, gate signals are applied to a gate line corresponding to the first row of sub-pixels and a gate line corresponding to the second row of sub-pixels in turn, and the gate signal of the second row of sub-pixels is delayed by 1H compared with the gate signal of the first row of sub-pixels.

For example, for the pixel array illustrated in FIG. 1A, a plurality of gate signals are applied to a plurality of gate lines corresponding to sub-pixels in a plurality row in the pixel array.

Figure 2B:
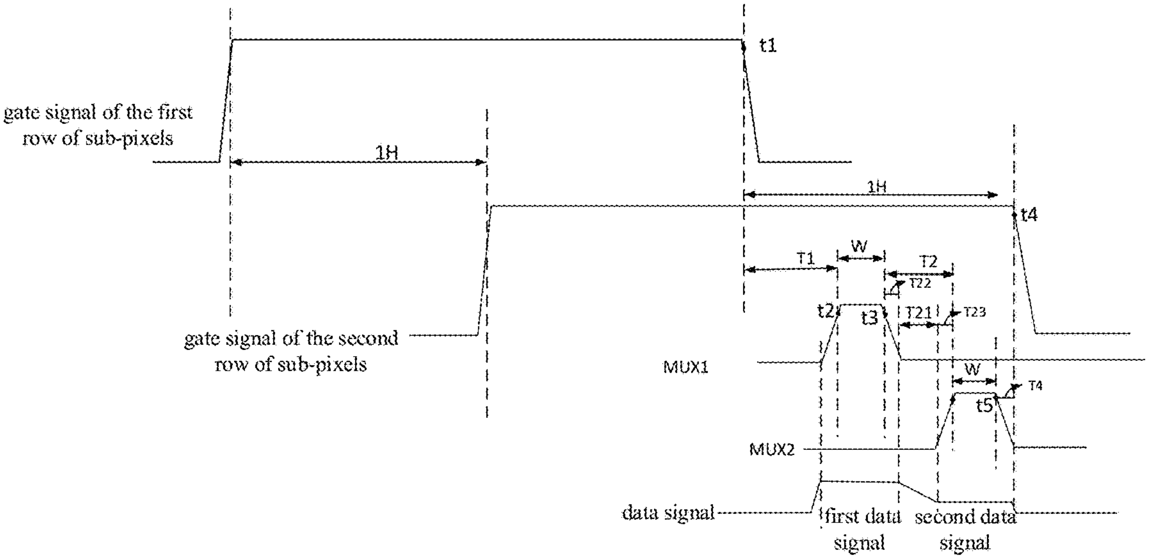
FIG. 2B illustrates a timing schematic diagram of a method for driving a pixel array provided by at least one embodiment of the present disclosure.

FIG. 2B illustrates a timing schematic diagram of a method for driving a pixel array provided by at least one embodiment of the present disclosure.

As illustrated in FIG. 2B, the first row of sub-pixels and the second row of sub-pixels are two adjacent rows of sub-pixels. The gate signal of the second row of sub-pixels is adjacent to the gate signal of the first row of sub-pixels in the timing, and the gate signal of the second row of sub-pixels is delayed by 1H compared with the gate signal of the first row of sub-pixels.

For step S20, a selection control signal corresponding to each row of sub-pixels is applied during applying gate signals to each row of sub-pixels in the plurality of rows of sub-pixels to control each row of sub-pixels.

For example, after the first duration length of the gate signal applied to the first row of sub-pixels being switched from the on-state to the off-state, the selection control signal corresponding to the second row of sub-pixels controls the switch modules to switch the connection states. For example, the selection control signal of the second row of sub-pixels controls switch modules to conduct the data lines corresponding to the first part sub-pixels in the second row of sub-pixels and data signal lines.

For example, the on-state of the gate signal is at a high level, the off-state of the gate signal is at a low level, and when the selection control signal is at a high level, the switch module conduct the data line and the data signal terminal. As illustrated in FIG. 2B, when the gate signal of the second row of sub-pixels is at a high level, the gate signal applied to the first row of sub-pixels switches from a high level to a low level at time t1, and the selection control signal MUX1 switches from a low level to a high level at time t2, so as to control the switch module to conduct the data lines corresponding to the first part sub-pixels in the second row of sub-pixels and the data signal terminal. Time t2 is later than time t1 by duration length T1, and T1 is greater than 0.

In at least one embodiment of the present disclosure, when a level reaches 90% of the highest level, it is deemed that the level reaches the high level, and when a level reaches 10% of the lowest level, it is deemed that the level reaches the low level.

In at least one embodiment of the present disclosure, the first duration length T1 causes the gate signal applied to the first row of sub-pixels to be turned off when the selection control signal is applied to the second row of sub-pixels.

In at least one embodiment of the present disclosure, after the first duration length of the gate signals applied to the first row of sub-pixels being switched from the on-state to the off-state, the selection control signal of the second row of sub-pixels controls the switch module corresponding to the second row of sub-pixels to switch from the off-state to the on-state, so that the second row of sub-pixels is charged to be written with data signals only after the first row of sub-pixels is completely closed, so as to alleviate the problems of pixel mischarge and abnormal display of the display image caused by the first row of sub-pixels not being completely closed.

Figure 2C:
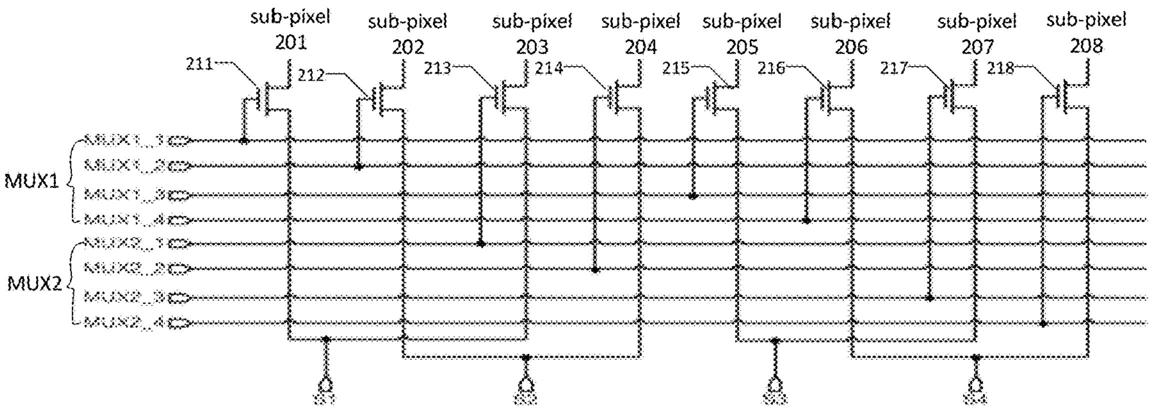
FIG. 2C illustrates a schematic diagram of a connection between sub-pixels and data signal terminals provided by at least one embodiment of the present disclosure.

FIG. 2C illustrates a schematic diagram of a connection between sub-pixels and data signal terminals provided by at least one embodiment of the present disclosure.

In some embodiments of the present disclosure, each row of sub-pixels is divided into a plurality of sub-pixel groups, and a plurality of data lines electrically connected with a plurality of sub-pixels in each sub-pixel group are electrically connected with one data signal terminal through switch module.

For example, each sub-pixel group includes a first sub-pixel and a second sub-pixel. The data line connected to the first sub-pixel is connected to the data signal terminal through a first switching element, and the data line connected to the second sub-pixel is connected to the data signal terminal through a second switching element.

For example, as illustrated in FIG. 2C, the sub-pixels in the same row include sub-pixel 201 to sub-pixel 208, etc. Sub-pixel 201 and sub-pixel 203 belong to one sub-pixel group, sub-pixel 202 and sub-pixel 204 belong to one sub-pixel group, sub-pixel 205 and sub-pixel 207 belong to one sub-pixel group, and sub-pixel 206 and sub-pixel 208 belong to one sub-pixel group. The embodiment does not limit the specific position of the row of sub-pixels.

In the example illustrated in FIG. 2C, two sub-pixels separated by one column of sub-pixel in each row of sub-pixels are designated as the first sub-pixel and the second sub-pixel, respectively. The first sub-pixel and the second sub-pixel form one sub-pixel group. For example, sub-pixel 201 and sub-pixel 203 belong to one sub-pixel group, sub-pixel 202 and sub-pixel 204 belong to one sub-pixel group, sub-pixel 205 and sub-pixel 207 belong to one sub-pixel group, and sub-pixel 206 and sub-pixel 208 belong to one sub-pixel group.

As illustrated in FIG. 2C, the switch module corresponding to the sub-pixel group composed of the sub-pixel 201 and the sub-pixel 203 includes a switching element 211 and a switching element 213. The data lines electrically connected to the sub-pixel 201 and the sub-pixel 203 are electrically connected to the data signal terminal S1 through the switching element 211 and the switching element 213, respectively. The switch module corresponding to the sub-pixel group composed of the sub-pixel 202 and the sub-pixel 204 includes a switching element 212 and a switching element 214. The data lines electrically connected to the sub-pixel 202 and the sub-pixel 204 are electrically connected to the data signal terminal S2 through the switching element 212 and the switching element 214, respectively. The switch module corresponding to the sub-pixel group composed of the sub-pixel 205 and the sub-pixel 207 includes a switching element 215 and a switching element 217. The data lines electrically connected to the sub-pixel 205 and the sub-pixel 207 are electrically connected to the data signal terminal S3 through the switching element 215 and the switching element 217, respectively. The switch module corresponding to the sub-pixel group composed of the sub-pixel 206 and the sub-pixel 208 includes a switching element 216 and a switching element 218. The data lines electrically connected to the sub-pixel 206 and the sub-pixel 208 are electrically connected to the data signal terminal S4 through the switching element 216 and the switching element 218, respectively. The switching element may be, for example, a thin film transistor.

In this embodiment, the selection control signals include a plurality of selection control signals. The plurality of selection control signals are respectively applied to different sub-pixels in one sub-pixel group. For example, a plurality of selection control signals includes a first selection control signal and a second selection control signal. During applying a gate signal to the second row of sub-pixels to control the second row of sub-pixels, a first selection control signal and a second selection control signal are applied to the first switching element and the second switching element corresponding to each sub-pixel group in the second row of sub-pixels, respectively, so that the first switching element and the second switching element are turned on in turn.

For example, as illustrated in FIG. 2C, the selection control signal of each row of sub-pixels includes the selection control signal MUX1 and the selection control signal MUX2. In some embodiments of the present disclosure, selection control signals may be applied to a plurality of sub-pixels respectively through a plurality of signal lines. For example, the selection control signal MUX1 includes MUX1_1, MUX1_2, MUX1_3 and MUX1_4, the selection control signal MUX2 includes MUX2_1, MUX2_2, MUX2_3 and MUX2_4. MUX1_1, MUX1_2, MUX1_3 and MUX1_4 are the signals with the same time sequence, MUX2_1, MUX2_2, MUX2_3 and MUX2_4 are the signal with the same time sequence. MUX1_1, MUX1_2, MUX1_3 and MUX1_4 are provided from 4 signal lines, respectively. MUX2_1, MUX2_2, MUX2_3 and MUX2_4 are provided from 4 signal lines, respectively. In this way, the driving ability of the selection control signals can be improved.

In other embodiments of the present disclosure, the selection control signal is applied to a plurality of sub-pixels through one signal line. For example, MUX1 comes from one signal line, and the selection control signal MUX1 is provided to the sub-pixel 201, the sub-pixel 202, the sub-pixel 205 and the sub-pixel 206 through one signal line. For example, MUX2 comes from another signal line, and the selection control signal MUX2 is provided to the sub-pixel 203, the sub-pixel 204, the sub-pixel 207 and the sub-pixel 208 through another signal line. The embodiment can save the layout space of the display panel and simplify the circuit.

As illustrated in FIG. 2C, the switching element 211 and the switching element 213 respectively receive the selection control signal MUX1 and the selection control signal MUX2, so as to switch the connection states of the plurality of data lines correspondingly connected to the switching element 211 and the switching element 213 with the data signal terminal S1.

For example, for the row where sub-pixel 201 to sub-pixel 208 are located, when the gate signal corresponding to the sub-pixels in this row is in the on-state, the selection control signal MUX1 and the selection control signal MUX2 are applied to the first switching element and the second switching element, respectively, and the first switching element and the second switching element are turned on sequentially by the selection control signal MUX1 and the selection control signal MUX2. For example, if the selection control signal MUX1 is at a high level and the selection control signal MUX2 is at a low level, the switching element 211 conducts the data line corresponding to the sub-pixel 201 and the data signal terminal S1, so as to charge the sub-pixel 201, and the switching element 213 disconnects the sub-pixel 203 and the data signal terminal S1. If the selection control signal MUX1 is at a low level and the selection control signal MUX2 is at a high level, the switching element 213 conducts the data line corresponding to the sub-pixel 203 and the data signal terminal S1, so as to charge the sub-pixel 203, and the switching element 211 disconnects the sub-pixel 201 and the data signal terminal S1. Other sub-pixel groups are similar to the sub-pixel group composed of the sub-pixel 201 and the sub-pixel 203, and will not be repeated here.

As illustrated in FIG. 2C, when the selection control signal MUX1 is at a high level, the data lines corresponding to the sub-pixel 201, the sub-pixel 202, the sub-pixel 205 and the sub-pixel 206 are connected with the data signal terminal S1, the data signal terminal S2, the data signal terminal S3 and the data signal terminal S4, respectively, so as to charge the sub-pixel 201, the sub-pixel 202, the sub-pixel 205 and the sub-pixel 206 through the data signal terminal S1, the data signal terminal S2, the data signal terminal S3 and the data signal terminal S4, respectively. Similarly, when the selection control signal MUX2 is at a high level, the data lines corresponding to the sub-pixel 203, the sub-pixel 204, the sub-pixel 207 and the sub-pixel 208 are connected with the data signal terminal S1, the data signal terminal S2, the data signal terminal S3 and the data signal terminal S4, respectively, so as to charge the sub-pixel 203, the sub-pixel 204, the sub-pixel 207 and the sub-pixel 208 through the data signal terminal S1, the data signal terminal S2, the data signal terminal S3 and the data signal terminal S4, respectively.

For example, the sub-pixel 201, the sub-pixel 202 and the sub-pixel 203 are red light sub-pixel, green light sub-pixel and blue light sub-pixel, respectively, and the sub-pixel 204, the sub-pixel 205 and the sub-pixel 206 are red light sub-pixel, green light sub-pixel and blue light sub-pixel, respectively.

It can be understood that although in the example of FIG. 2C, two sub-pixels are regarded as one sub-pixel group, the disclosure is not limited to the case where two sub-pixels form one sub-pixel group. For example, three sub-pixels may be regarded as one sub-pixel group, four sub-pixels may be regarded as one sub-pixel group, and so on. That is, each sub-pixel group includes at least two sub-pixels.

In some embodiments of the present disclosure, there is a second duration length between a moment of the first selection control signal controlling the first switching element to switch from turn-on to turn-off and a moment of the second selection control signal controlling the second switching element to turn on, and the second duration length is greater than 0.

As illustrated in FIG. 2B, when the gate signal of the second row of sub-pixels is at a high level, the selection control signal MUX1 switches from high level to low level at time t3, so that the data lines corresponding to the first part sub-pixels and data signal terminal are switched from turn-on to turn-off. After the second duration length T2 from time t3, the selection control signal MUX2 switches from low level to high level, so as to control the switch module to connect the data line corresponding to the second part sub-pixels in the second row with the data signal terminal, and the second duration length T2 is greater than 0.

The driving method can make the switching element corresponding to the first part sub-pixels of the second row of sub-pixels completely disconnected, and then connect the data line corresponding to the second part sub-pixels of the second row of sub-pixels with the data signal terminal, thus further improving the display quality and more conforming to the characteristics of the display panel.

In some embodiments of the present disclosure, the second duration length is determined according to a duration length required for the data signal terminal to switch from a first data signal to a second data signal, a duration length required for the first switching element to switch from turn-on to turn-off, and a duration length required for the second switching element to switch from turn-off to turn-on.

For example, the second duration length T2 is a sum of the duration length required for the data signal terminal to switch from a first data to a second data, the duration length required for the first switching element to switch from turn-on to turn-off, and the duration length required for the second switching element to switch from turn-off to turn-on. For example, the duration length required for the first switching element to switch from turn-on to turn-off is the duration length T22 required for the selection control signal MUX1 corresponding to the first switching element to switch from high level to low level. The duration length required for the second switching element to switch from turn-off to turn-on is the duration length T23 required for the selection control signal MUX2 corresponding to the second switching element to switch from low level to high level.

As illustrated in FIG. 2B, the second duration length T2 is a sum of a duration length T21 required for the data signal terminal to switch from the first data to the second data, the duration length T22 required for the selection control signal MUX1 to switch from high level to low level, and the duration length T23 required for the selection control signal MUX2 to switch from low level to high level. That is, T2=T21+T22+T23.

In some embodiments of the present disclosure, each sub-pixel group includes N sub-pixels, where N is an integer greater than or equal to 2, and the gate signals are periodic signals. Within a third duration length during which the gate signals are in the on-state in each cycle, the selection control signal corresponding to the second row of sub-pixels control switch modules to switch the connection states. The calculation formula of the pulse width of the selection control signal is:

$$W = (T3 - T1 - (N-1) \times T2)/N$$

W represents the pulse width, T3 represents the third duration length, T1 represents the first duration length, and T2 represents the second duration length.

The third duration length T3 refers to the time period when the gate signal of the second row of sub-pixels in the two adjacent rows of sub-pixels is in the on-state and the gate signal of the first row of sub-pixels is in the off-state, that is, the time period corresponding to the position where the on-state durations of the two adjacent rows of gate lines do not overlap. As illustrated in FIG. 2B, in one cycle of the gate signals, the time period in which the gate signal of the second row of sub-pixels is in the on-state and the gate signal of the first row of sub-pixels is in the off-state is 1H, so in this example, the third duration length T3 is 1H.

For example, in the example of FIG. 2B, N=2, W=(1H−T1−T2)/2. For example, if T1=1300 ns, T2=750 ns, 1H=3700 ns, then W=825 ns.

In other embodiments of the present disclosure, the calculation formula of the pulse width of the selection control signal is:

$$W = (T3 - T1 - (N-1) \times T2 - T4)/N$$

T4 is a duration length between a moment when the gate signal of the second row of sub-pixels switches from the on-state to the off-state and the moment when the last selection control signal in a sub-pixel group switches from the high level to the low level. As illustrated in FIG. 2B, T4 is the duration length between the time t4 when the gate signal of the second row of sub-pixels switches from the on-state to the off-state and the time t5 when MUX2 switches from the high level to the low level. This can ensure that the gate signal is always in the on-state during charging the second row of sub-pixels, so as to ensure full charging of the second row of sub-pixels.

For example, in the example of FIG. 2B, N=2, W=(1H−T1−T2−T4)/2. For example, if T1=1300 ns, T2=750 ns, 1H=3700 ns, and T4=150 ns, then W=750 ns.

The duration length T4 may be set by the person skilled in the art according to experience or actual needs, for example, T4 may further be 50 ns, 100 ns, etc.

Figure 2D:
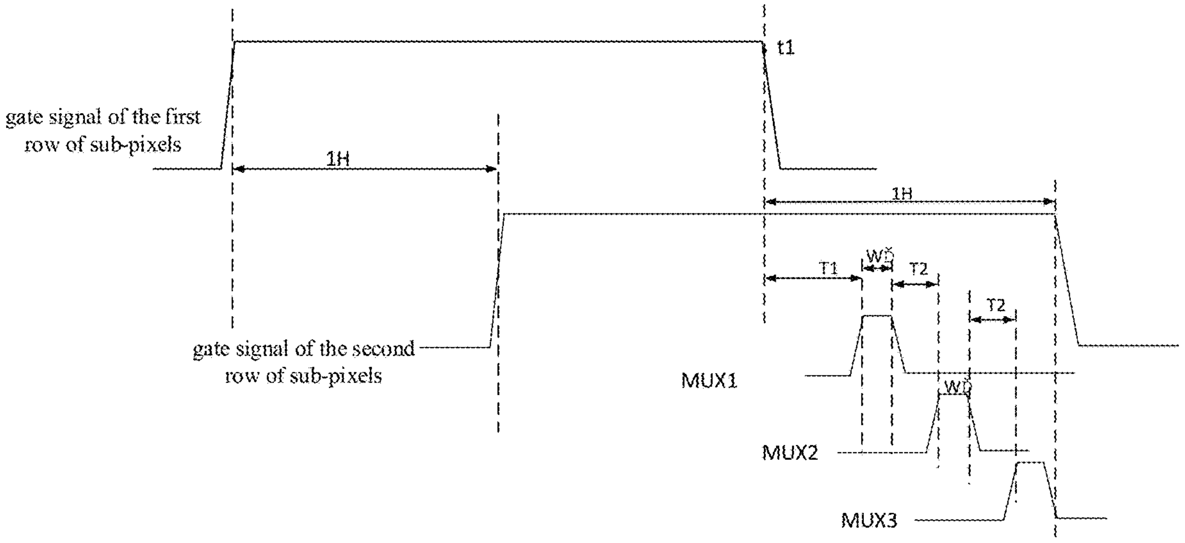
FIG. 2D illustrates a timing schematic diagram of a sub-pixel group including three sub-pixels provided by at least one embodiment of the present disclosure.

FIG. 2D illustrates a timing schematic diagram of a sub-pixel group including three sub-pixels provided by at least one embodiment of the present disclosure.

As illustrated in FIG. 2D, when N=3, three sub-pixels in the same one sub-pixel group are applied with the selection control signal MUX1, the selection control signal MUX2 and the selection control signal MUX3, respectively. The pulse width of the selection control signal MUX1, MUX2 and MUX3 is W', W'=(1H−T1−2×T2)/3.

In some embodiments of the present disclosure, a value range of a ratio of the first duration length T1 to the second duration length T2 may be [0.8, 3.0]. For example, the ratio of the first duration length T1 to the second duration length T2 may be a value between a range from 1.5 to 2.0. For example, T1=1300 ns, T2=750 ns.

In some embodiments of the present disclosure, a value range of a ratio of the third duration length T3 to the first duration length T1 may be [1.0, 5.0]. For example, the ratio of the third duration length T3 to the first duration length T1 may be a value between a range from 2.0 to 3.5. For example, the third duration length T3 is 1H, 1H=3700 ns.

In some embodiments of the present disclosure, a value range of a ratio of the second duration length T2 to the pulse width may be [0.3, 2.0]. For example, the ratio of the second duration length T2 to the pulse width may be a value between a range from 0.8 to 1.2. For example, the second duration length T2 is equal to the pulse width.

In some embodiments of the present disclosure, a value range of a ratio of the first duration length T1 to the pulse width may be [0.7, 3.0]. For example, the ratio of the first duration length T1 to the pulse width may be a value between a range from 1.5 and 2.0.

In the embodiments of the present disclosure, the first duration length T1 needs to be a suitable value to satisfy that when the selection control signal is applied to the second row of sub-pixels, the gate signal applied to the first row of sub-pixels is turned off.

For example, a plurality of different values may be assigned to the first duration length T1, and then a display test may be carried out for each value to determine an appropriate T1 value from the plurality of different T1 values, so as to alleviate pixel mischarge.

In some embodiments of the present disclosure, for example, the image used for display test may be a black and white checkerboard. When performing a display test, gate signals and selection control signals are applied to the pixel array according to the timing of the gate signals and the selection control signals of the two adjacent rows of sub-pixels described above, and the pixel array displays two different frames of black and white checkerboard images in turn. The black pixels in the first black and white checkerboard image become white pixels in the second black and white checkerboard image, and the white pixels in the first black and white checkerboard image become black pixels in the second black and white checkerboard image. Whether there is pixel mischarge at the junction of black and white in the second frame of image is detected. If the first duration length is a first value, and the black and white grid images displayed on the display panel are free of charge errors, the first value meets the display requirements, and the first value may be used as the first duration length.

In some embodiments of the present disclosure, for example, a plurality of values of the first duration length T1 may be set sequentially from small to large, and then the above-mentioned display test is performed for each value to determine the minimum value that meets the display requirements from the plurality of values, and the minimum value is taken as the first duration length T1.

For example, the first duration length T1 is set to be 800 ns, 900 ns, 1000 ns, 1100 ns, 1200 ns, 1300 ns, 1400 ns, 1500 ns, respectively, and the display test is performed in the order of duration length from small to large. If when the first duration length T1 is 800 ns, 900 ns, 1000 ns, 1100 ns, 1200 ns, respectively, the display image illustrates pixel mischarge, and when the first duration length T1 is 1300 ns, the display image illustrates there is no pixel mischarge, then the minimum value of the first duration length T1 is 1300 ns.

In some embodiments of the present disclosure, for example, the best first duration length T1 may be determined from 1200 ns and 1300 ns by dichotomy.

In some embodiments of the present disclosure, the first duration length is positively related to a length of a connecting line of the first row of sub-pixels, and the connecting line is configured to connect a signal source of the gate signals with a receiving terminal of the gate line corresponding to each row of sub-pixels. The embodiment is described below with reference to FIG. 3.

Figure 3:
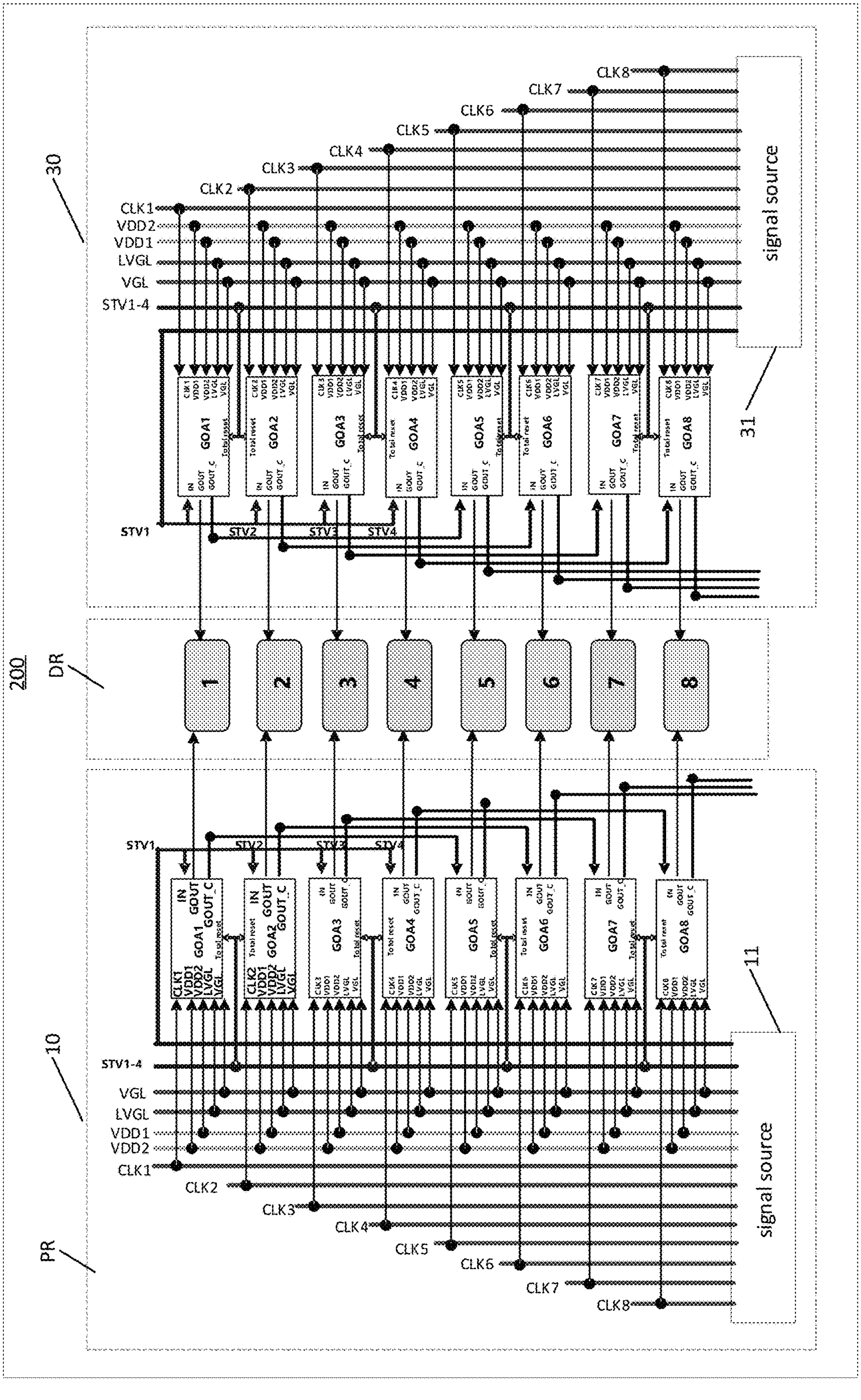
FIG. 3 illustrates a display panel provided by at least one embodiment of the present disclosure.

FIG. 3 illustrates a display panel 200 provided by at least one embodiment of the present disclosure.

As illustrated in FIG. 3, the display panel 200 includes a display area DR and a non-display area PR except the display area DR, for example, the non-display area PR surrounds the display area DR.

It should be understood that FIG. 3 is only a schematic diagram. For the convenience of explanation, the display area DR is reduced and the non-display area PR is expanded. Therefore, the area size relationship between the display area DR and the non-display area PR illustrated in FIG. 3 is not a real size relationship. For example, the area of the display area is usually larger than the area of the non-display area.

The display area DR includes a pixel array, and the pixel array includes sub-pixels in a plurality of rows and columns. For example, the pixel array may be similar to the pixel array in the display panel 100 illustrated in FIG. 1A. Number 1, 2, 3, 4, 5, 6, 7, and 8 in FIG. 3 represent the gate lines connected with each row of sub-pixels (such as sub-pixels in the row PI<1>, . . . , sub-pixels in the row PI<8> of the pixel array in FIG. 1A). The non-display area PR includes a gate driving circuit 10 and a gate driving circuit 30. The gate driving circuit 10 and the gate driving circuit 30 each include a plurality of cascaded shift register units. For example, a plurality of cascaded shift register units are, for example, the first level shift register unit GOA1, the second level shift register unit GOA2, . . . , the eighth level shift register unit GOA8, and so on. It should be understood that although eight shift register units are illustrated in the figure, the disclosure does not limit the amount of shift register units, and the amount of shift register units may be determined according to actual needs.

For example, the gate line of a plurality of sub-pixels in the same line are connected with one shift register unit in the gate driving circuit 10 and one shift register unit in the gate driving circuit 30 to receive the gate signals output by the shift register units. For example, a plurality of sub-pixels in a row of sub-pixels near the gate driving circuit 10 are provided with a gate signal by the gate driving circuit 10, and a plurality of sub-pixels in a row of sub-pixels near the gate driving circuit 30 are provided with a gate signal by the gate driving circuit 30. In other embodiments of the present disclosure, the display panel may also include only one gate driving circuit, and the gate line the sub-pixels in the same row is connected with one shift register unit of the gate driving circuit, and the shift register unit provides a gate signal to a row of sub-pixels.

As illustrated in FIG. 3, for example, the gate driving circuit may include 8 clock signals of CLK1-CLK8, or may include 6 or 12 clock signals, which is not limited here. Each shift register unit has a first voltage terminal VDD1, a second voltage terminal VDD2, a clock signal terminal CLKi (i is 1, 2, . . . , N (N is an integer greater than 1)), a third voltage terminal LVGL, a fourth voltage terminal VGL, a reset signal terminal (Total reset), an input terminal IN, a first output terminal GOUT and a second output terminal GOUT_C. As illustrated in FIG. 3, except for the shift register unit of first level to the shift register unit of fourth level, the input terminal IN of the shift register unit of k+4 level is connected to the first output terminal GOUT_C of the shift register unit of k level, k is an integer greater than or equal to 1. The input terminals IN of the shift register unit of first level to the shift register unit of fourth level are respectively connected with a signal line STV1, a signal line STV2, a signal line STV3 and a signal line STV4 to receive a frame starting signal from the signal line STV1, the signal line STV2, the signal line STV3 and the signal line STV4. Optionally, STV1-STV4 are the same frame starting signal. The first output terminal GOUT is configured to output a gate signal to a gate line. Shift register unit of each level receives voltage signals from a signal line VDD1, a signal line VDD2, a signal line LVGL and a signal line VGL, respectively. For example, the voltage signal VDD1 on the signal line VDD1 and the voltage signal VDD2 on the signal line VDD2 are high level and low level relative to each other, which may be used for a noise reduction circuit in the shift register unit. The voltage signal VGL on the signal line VGL is used to lower the level of the display area, and the voltage signal LVGL on the signal line LVGL is used to lower the level of the noise reduction circuit.

As illustrated in FIG. 3, the gate driving circuit 10 and the gate driving circuit 30 further respectively include a sub clock signal line CLK1 for transmitting a first sub clock signal, a sub clock signal line CLK2 for transmitting a second sub clock signal, a sub clock signal line CLK3 for transmitting a third sub clock signal, a sub clock signal line CLK4 for transmitting a fourth sub clock signal, a sub clock signal line CLK5 for transmitting a fifth sub clock signal, a sub clock signal line CLK6 for transmitting a sixth sub clock signal, a sub clock signal line CLK7 for transmitting a seventh sub clock signal, and a sub clock signal line CLK8 for transmitting an eighth sub clock signal.

For example, the number N of the shift register units included in the gate driving circuit 10 and the gate driving circuit 30 is an integer multiple of 8. Each 8 shift register units are taken as a cycle group to receive the clock signals from the sub clock signal lines CLK1 to CLK8, and output gate signals through a plurality of first output terminals GOUT to sub-pixels in a plurality of rows in response to the clock signals. For example, as illustrated in FIG. 3, a clock signal terminal CLK1 of the shift register unit of first level is connected with the sub clock signal line CLK1; a clock signal terminal CLK2 of the shift register unit of second level is connected with the sub clock signal line CLK2; a clock signal terminal CLK3 of the shift register unit of third level is connected with the sub clock signal line CLK3; a clock signal terminal CLK4 of the shift register unit of fourth level is connected with the sub clock signal line CLK4; a clock signal terminal CLK5 of the shift register unit of fifth level is connected with the sub clock signal line CLK5; a clock signal terminal CLK6 of the shift register unit of sixth level is connected with the sub clock signal line CLK6; a clock signal terminal CLK7 of the shift register unit of seventh level is connected with the sub clock signal line CLK2; a clock signal terminal CLK8 of the shift register unit of eighth level is connected with the sub clock signal line CLK2; a clock signal terminal CLK9 of the shift register unit of ninth level is connected with the sub clock signal line CLK1. The embodiment of the present disclosure does not limit the specific structure of the shift register unit. FIG. 3 illustrates the two-sided drive, that is, the same row of pixels is driven by the gate driving circuits at the left and right ends. Of course, it may also be one-sided drive, such as there is only the driving circuit at one side of the non-display area, or it may be two-sided parity drive, for example, the gate driving circuit at one side drives odd row of pixels, the gate driving circuit on the other side drives even row of pixels, which is not limited here.

As illustrated in FIG. 3, the gate driving circuit 10 and the gate driving circuit 30 may further include a signal source 11 and a signal source 31, respectively. The signal source 11 is configured, for example, to provide each of the above-mentioned signals to all levels of shift register units of the gate driving circuit 10, and the signal source 31 is configured, for example, to provide each of the above-mentioned signals to all levels of shift register units of the gate driving circuit 30. It should be noted that a phase relationship between the plurality of clock signals provided by the signal source 11 and the signal source 31 may be determined according to actual needs. In different examples, more clock signals may be provided according to different configurations. Since the gate driving circuit 10 is similar to the gate driving circuit 30, the embodiments of the present disclosure will be described below with the gate driving circuit 10 and the signal source 11 as examples.

For example, the signal source 11 provides clock signals to each shift register unit through the sub clock signal lines CLK1 to CLK8, respectively, so that each shift register unit outputs a gate signal. For example, respective shift register units output the gate signals CK1~CK8 as illustrated in FIG. 1A. In fact, the clock signals provided by the sub clock signal lines CLK1 to CLK8 are the same as the gate signals CK1~CK8.

When the sub clock signal (one of CLK1~CLK8) received by the clock signal terminal CLKi of the shift register unit of k level is at a high level, the gate signal output by the first output terminal GOUT of the shift register unit of k level is in the on-state.

Since the above-mentioned sub clock signals CLK1 and CLK8 are adjacent in timing, the timing of the gate signals output by the eight shift register units illustrated in FIG. 3 is adjacent to each other in the following order: the gate signal output by the first output terminal GOUT of the shift register unit of first level→the gate signal output by the first output terminal GOUT of the shift register unit of second level→the gate signal output by the first output terminal GOUT of the shift register unit of third level→the gate signal output by the first output terminal GOUT of the shift register unit of fourth level→the gate signal output by the first output terminal GOUT of the shift register unit of fifth level→the gate signal output by the first output terminal GOUT of the shift register unit of sixth level→the gate signal output by the first output terminal GOUT of the shift register unit of seventh level→the gate signal output by the first output terminal GOUT of the shift register unit of eighth level. FIG. 3 illustrates that a gate driving circuit includes two output terminals, and the output terminal GOUT is configured to output a gate driving signal to the pixels in the corresponding row, and the output terminal GOUT_C is configured to transmit cascade signals. For example, the GOUT_C of the shift register unit of first level provides an input signal for the shift register unit of fifth level. The gate driving circuit may also only be provided with the output terminal GOUT, that is, GOUT is not only the output signal of the current line, but also the input signal of other cascaded line, which are not limited here.

Since the plurality of sub-pixels are arranged into a plurality of rows from far to near, the distances between receiving terminals of the gate signals of each row of sub-pixels and the signal sources 11 are different, so the lengths of the connecting lines required by each row of sub-pixels are different. Here, the lengths of the connecting lines are different means that the circuit transmission paths of CLK signals transmitted from the end of the signal source to each row of pixels are different. The connecting lines are configured to connect the signal source of the gate signals with the receiving terminals of the gate lines corresponding to each row of sub-pixels. As illustrated in FIG. 3, the connecting lines refer to the routings between the signal source 11 and the receiving terminals of the gate lines corresponding to each row of sub-pixels. The signal source may be a timing controller IC. For example, the timing controller IC (source IC) is connected to CLK lines of the display panel through a flexible circuit board after passing a level shifter unit. For example, the display panel is bound by chip on film (COF), that is, the source IC is bound to an FPC flexible circuit board, one end of the flexible circuit board is bound to the non-display area of the display panel, and the other end of the flexible circuit board is bound to a PCB circuit board. The timing controller IC (TCON-IC) is set on the PCB circuit board. The clock signal output by the timing controller IC is transmitted to the CLK signal lines of the display panel through the signal lines on the flexible circuit board after passing through the level shifter unit. Optionally, the signal lines of the flexible circuit board and the CLK signal lines of the display panel may be electrically connected through their respective binding terminals, for example, the bonding pad of the display panel and the golden finger of the flexible circuit board. Of course, the disclosure also includes the chip on glass (COG) mode, that is, the source IC is directly bound to the non-display area of the display panel, and no limitation is made here. The routings include sub clock signal lines between the signal source 11 and the all levels of shift register units and the routings between the shift register units at all levels and the receiving terminals of the corresponding connected gate lines. Since the length of a plurality of routing lines between the shift register units at all levels and the receiving terminals of the corresponding connected gate lines are not much different, the difference of the distance between the receiving terminals of the gate signals of each row of sub-pixels and the signal source 11 is mainly reflected in the different lengths of the plurality of sub clock signal lines (i.e., the sub clock signal lines CLK1~CLK8). It should be noted that the different lengths here refer to the different distances of electrical transmission signals. FIG. 3 illustrates that the physical lengths of CLK1-CLK8 clock signal lines are different. Of course, the physical lengths of CLK1-CLK8 clock signal lines may also be designed in the same way, but in this case, the electrical transmission path from the signal source to the CLK1 signal corresponding to the first row of pixels is to the position of the black node in the figure, and the electrical transmission path to the CLK8 signal corresponding to the eighth row of pixels is to the position of the black node in the figure. It can be seen that the electrical transmission path of the CLK signal transmission of the first row of pixels is longer than that of the CLK signal transmission of the eighth row of pixels.

For example, the signal source 11 is located at the lower left corner of the display panel 200. The sub clock signal line CLK1 to the sub clock signal line CLK8 corresponding to the sub-pixels in the row PI<1> to the sub-pixels in the row PI<8> are getting shorter and shorter, that is, the connecting lines between the sub-pixels in the row PI<1> to the sub-pixels in the row PI<8> and the signal source 11 are getting shorter and shorter. For example, the sub clock signal line CLK7 required for the seventh row of sub-pixels is longer than the sub clock signal line CLK8 required for the eighth row of sub-pixels.

Because the lengths of the sub clock signal lines required by each row of sub-pixels are different, the delay of the gate signals received by each row of sub-pixels in the sub clock signal lines are different.

Figure 4:
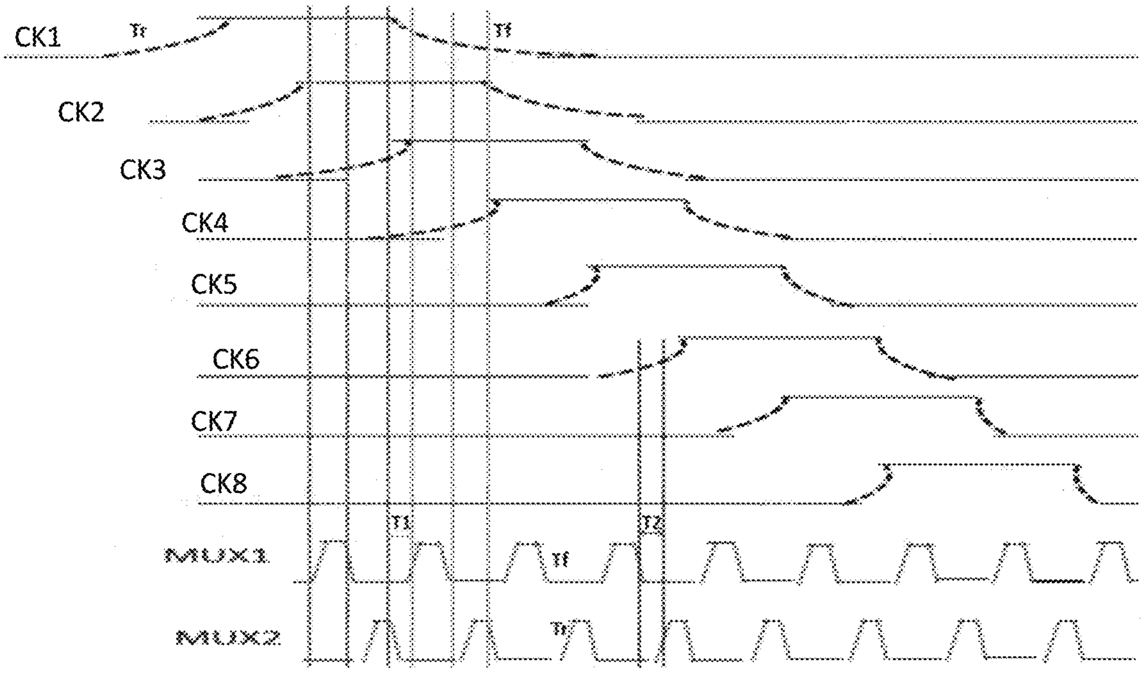
FIG. 4 illustrates a timing diagram of gate signals received by each row of sub-pixels in the display panel illustrated in FIG. 3 provided by at least one embodiment of the present disclosure.

FIG. 4 illustrates a timing diagram of gate signals received by each row of sub-pixels in the display panel illustrated in FIG. 3 provided by at least one embodiment of the present disclosure.

As illustrated in FIG. 4, since the sub clock signal line CLK1 corresponding to the first row of sub-pixels to the sub clock signal line CLK8 corresponding to the eighth row of sub-pixels is getting shorter and shorter, the delay of the gate signal CK1 received by the first row of sub-pixels to the gate signal CK8 received by the eighth row of sub-pixels is getting smaller and smaller, so the duration length of the rising edge of CK1 to CK8 is getting shorter and shorter, that is, the corresponding duration length of the rising edge of the gate signal received from the first row of sub-pixels to the eighth row of sub-pixels becomes shorter and shorter.

In some embodiments of the present disclosure, for example, because the connecting lines from the sub-pixels in the row PI<1> to the sub-pixels in the row PI<N> is getting shorter and shorter, the delay of the gate signals from the sub-pixels in the row PI<1> to the sub-pixels in the row PI<N> is getting shorter and shorter (that is, the time required for the rising edge and the falling edge is getting shorter and shorter), so the time required for the gate signals from the sub-pixels in the row PI<1> to the sub-pixels in the row PI<N> to switch from the on-state to the off-state is getting shorter and shorter. Therefore, the first duration length of each row of sub-pixels for switching is also getting shorter and shorter.

For example, the connecting line corresponding to the sub-pixels in the row PI<1> is longer than the connecting line corresponding to the sub-pixels in the row PI<2>, so the first duration length of the sub-pixels in the row PI<1> for switching is longer than the first duration length of the sub-pixels in the row PI<2> for switching.

In this way, an appropriate first duration length may be set for each row of sub-pixels, which can improve the display efficiency while alleviating pixel mischarge.

Figure 5:
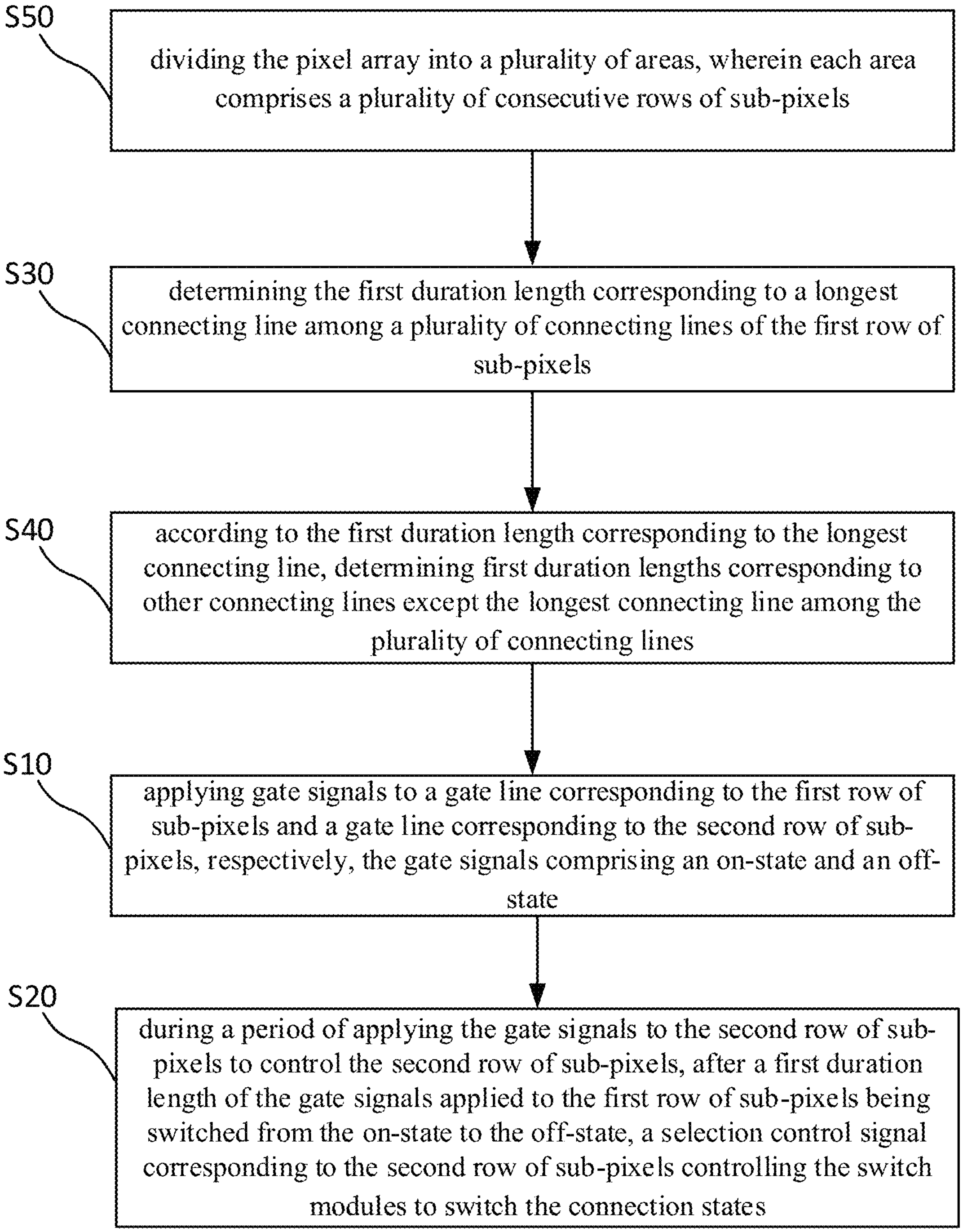
FIG. 5 illustrates a flow chart of another driving method provided by at least one embodiment of the present disclosure.

FIG. 5 illustrates a flow chart of another driving method provided by at least one embodiment of the present disclosure.

As illustrated in FIG. 5, the driving method may include steps S30 and S40 in addition to steps S10 and S20. Steps S30 and S40 may be performed before steps S10 and S20, for example.

Step S30: determining the first duration length corresponding to a longest connecting line among a plurality of connecting lines of the first row of sub-pixels.

Step S40: according to the first duration length corresponding to the longest connecting line, determining first duration lengths corresponding to other connecting lines except the longest connecting line among the plurality of connecting lines.

This method can reduce the time of determining the first duration length corresponding to each row of sub-pixel, and improve the efficiency of determining the first duration length.

For step S30, the first duration length corresponding to the longest connecting line may be the first duration length corresponding to a row of sub-pixels farthest from the signal source. For example, in the example illustrated in FIG. 1A, the sub-pixels in the row PI<1> is the row of sub-pixels farthest from the signal source, and thus the first duration length corresponding to the sub-pixels in the row PI<1> can be determined in step S30.

For example, the first duration length corresponding to the longest connecting line is determined according to the above-mentioned method of the display test by using black and white checkerboard image.

For step S40, for example, according to the first duration length corresponding to the sub-pixels in the row PI<1>, the respective first duration lengths of the sub-pixels in the row PI<2>, . . . , the sub-pixels in the row PI<N> are determined.

In some embodiments of the present disclosure, for example, those skilled in the art can determine the difference between the first duration lengths of two adjacent rows based on experience, and the corresponding first duration length of each row of sub-pixel successively reduces the difference.

In other embodiments of the present disclosure, the first duration length corresponding to the shortest connecting line may also be determined, and the difference between the first duration lengths of two adjacent rows may be determined according to the first duration length corresponding to the shortest connecting line and the first duration length corresponding to the longest connecting line.

As illustrated in FIG. 5, the driving method includes step S50 in addition to steps S10 to S40. For example, step S50 may be executed before step S30.

Step S50: dividing the pixel array into a plurality of areas, where each area comprises a plurality of consecutive rows of sub-pixels.

In this embodiment, step S30 includes: determining a far-end area farthest from the signal source of the gate signals from the plurality of areas, and determining the first duration length corresponding to the longest connecting line based on the connecting lines corresponding to the first row of sub-pixels in the far-end area.

In this embodiment, step S40 includes: determining one first duration length for the sub-pixels in the plurality of rows in each area according to the first duration length corresponding to the longest connecting line.

In this embodiment, the first duration lengths corresponding to the sub-pixels in the plurality of rows in each area may be the same.

In this embodiment, the pixel array is divided into a plurality of areas, and the first duration length is determined for each area, thereby improving the calculation efficiency.

In some embodiments of the present disclosure, the amounts of rows of sub-pixels in respective area are the same or different.

A plurality of areas of the pixel array may be divided by those skilled in the art according to the circuit routings in the display panel. For example, several rows of the sub-pixels in the plurality of rows with a small difference in the delay of the gate signals are divided into one area.

For example, the pixel array includes the sub-pixels in the row PI<1>, the sub-pixels in the row PI<2>, . . . , the sub-pixels in the row PI<N>, that is, there is N (N>50) rows of sub-pixels in total, and the receiving terminals of the gate lines of the sub-pixels in the row PI<1>, the sub-pixels in the row PI<2>, . . . , the sub-pixels in the row PI<N> are getting closer and closer to the signal source. Every 50 rows of sub-pixels are taken as one area, then the far-end area farthest from the signal source of the gate signals is the area where PI<1>, PI<2>, . . . , and PI<50> are located.

In some embodiments of the present disclosure, as described in step S30 above, determining the first duration length corresponding to the longest connecting line based on the connecting lines corresponding to the first row of sub-pixels in the far-end area includes: taking the first duration length corresponding to the first row of sub-pixels farthest from the signal source in the far-end area as the first duration length corresponding to the longest connecting line.

For example, the sub-pixels in the row PI<1> are farthest from the signal source, and thus the first duration length corresponding to the sub-pixels in the row PI<1> is taken as the first duration length corresponding to the longest connecting line.

In some embodiments of the present disclosure, determining the first duration length corresponding to the longest connecting line based on the connecting lines corresponding to the first row of sub-pixels in the far-end area includes: calculating an average value of the first duration lengths corresponding to respective sub-pixels of the plurality of first row in the far-end area, and taking the average value as the first duration length corresponding to the longest connecting line. For example, the first duration length corresponding to the longest connecting line is $(T_{PI<1>}+T_{PI<2>}+\ldots+T_{PI<50>})/50$. $T_{PI<1>}$, $T_{PI<2>}$, . . . , and $T_{PI<50>}$ respectively represent the first duration lengths corresponding to PI<1>, PI<2>, . . . , and PI<50>.

In some embodiments of the present disclosure, as described in step S40 above, determining one first duration length for the sub-pixels in the plurality of rows in each area according to the first duration length corresponding to the longest connecting line, includes: determining a difference value between the first duration lengths in adjacent areas, and determining one first duration length for the sub-pixels in the plurality of rows in each area according to the difference value.

For example, those skilled in the art may determine the difference value between the first duration lengths of two adjacent areas based on experience, and determine the first duration length corresponding to each area based on the difference value and the first duration length corresponding to the longest connecting line. The first duration lengths corresponding to the sub-pixels in the plurality of rows in each area are the same.

In other embodiments of the present disclosure, the first duration length corresponding to the area closest to the signal source may also be determined, and the difference value between the first duration lengths of two adjacent areas is determined according to the first duration length corresponding to the area closest to the signal source and the first duration length corresponding to the longest connecting line.

Another aspect of the present disclosure provides a display panel, which includes a pixel array formed by sub-pixels in a plurality of rows and columns, a plurality of gate lines and a plurality of data lines intersect to define the sub-pixels in the plurality of rows and columns, and the data lines electrically connected to the sub-pixels are electrically connected with data signal terminals through switch modules, and the switch modules receive selection control signals to switch connection states of the data lines with the data signal terminals. Sub-pixels in the plurality of rows comprise a first row of sub-pixels and a second row of sub-pixels, the first row is adjacent to the second row, and the first row of sub-pixels and the second row of sub-pixels receive gate signals from a gate line corresponding the first row of sub-pixels and a gate line corresponding to the second row of sub-pixels, respectively. The gate signal comprises an on-state and an off-state. During a period of applying the gate signals to the second row of sub-pixels to control the second row of sub-pixels, and after a first duration length of the gate signals received by the first row of sub-pixels switching from the on-state to the off-state, the switch modules of the second row of sub-pixels receive selection control signals to control the switch modules of the second row of sub-pixels to switch the connection states.

For example, the display panel may be an example illustrated in FIG. 1A or FIG. 3. Reference can be made to the description of FIG. 1A or FIG. 3 above for the relevant description of the display panel.

In some embodiments of the present disclosure, each row of sub-pixels is divided into a plurality of sub-pixel groups, a plurality of data lines electrically connected with a plurality of sub-pixels in each sub-pixel group are electrically connected with one data signal terminal through the switch module, respectively, and a switch module corresponding to each sub-pixel group comprises a plurality of switching elements, and the selection control signals comprise a plurality of selection control signals, and the plurality of switching elements receive the plurality of selection control signals, respectively, so as to switch connection states of the plurality of data lines correspondingly connected with the plurality of switching elements and the data signal terminal.

In some embodiments of the present disclosure, each sub-pixel group comprises a first sub-pixel and a second sub-pixel, a data line connected with the first sub-pixel is connected with the data signal terminal through a first switching element, and a data line connected with the second sub-pixel is connected with the data signal terminal through a second switching element, and the plurality of selection control signals comprise a first selection control signal and a second selection control signal. During a period of the second row of sub-pixels receiving the gate signals, the first switching element and the second switching element corresponding to each sub-pixel group in the second row of sub-pixels are turned on in turn in response to the first selection control signal and the second selection control signal, respectively.

In some embodiments of the present disclosure, there is a second duration length between a moment when the first switching element is switched from turn-on to turn-off and a moment when the second switching element is turned on. The second duration length is greater than 0.

In some embodiments of the present disclosure, the display panel comprises a non-display area and a display area, the pixel array is located in the display area, and the non-display area comprises a signal source of the gate signals.

As illustrated in FIG. 3, the display panel 200 includes a non-display area PR and a display area DR. The pixel array is located in the display area DR, and the non-display area PR includes a signal source 11 and a signal source 31 of the gate signals.

Another aspect of the present disclosure provides a device for driving a pixel array, the pixel array includes sub-pixels in a plurality of rows and columns, a plurality of gate lines and a plurality of data lines intersect to define the sub-pixels in the plurality of rows and columns. The data lines electrically connected to the sub-pixels are electrically connected with data signal terminals through switch modules, respectively, and the switch modules receive selection control signals to switch connection states of the data lines with the data signal terminals, and sub-pixels in the plurality of rows comprise a first row of sub-pixels and a second row of sub-pixels, the first row is adjacent to the second row. The pixel array may refer to the pixel array in the display panel 100 illustrated in FIG. 1A.

Figure 6:
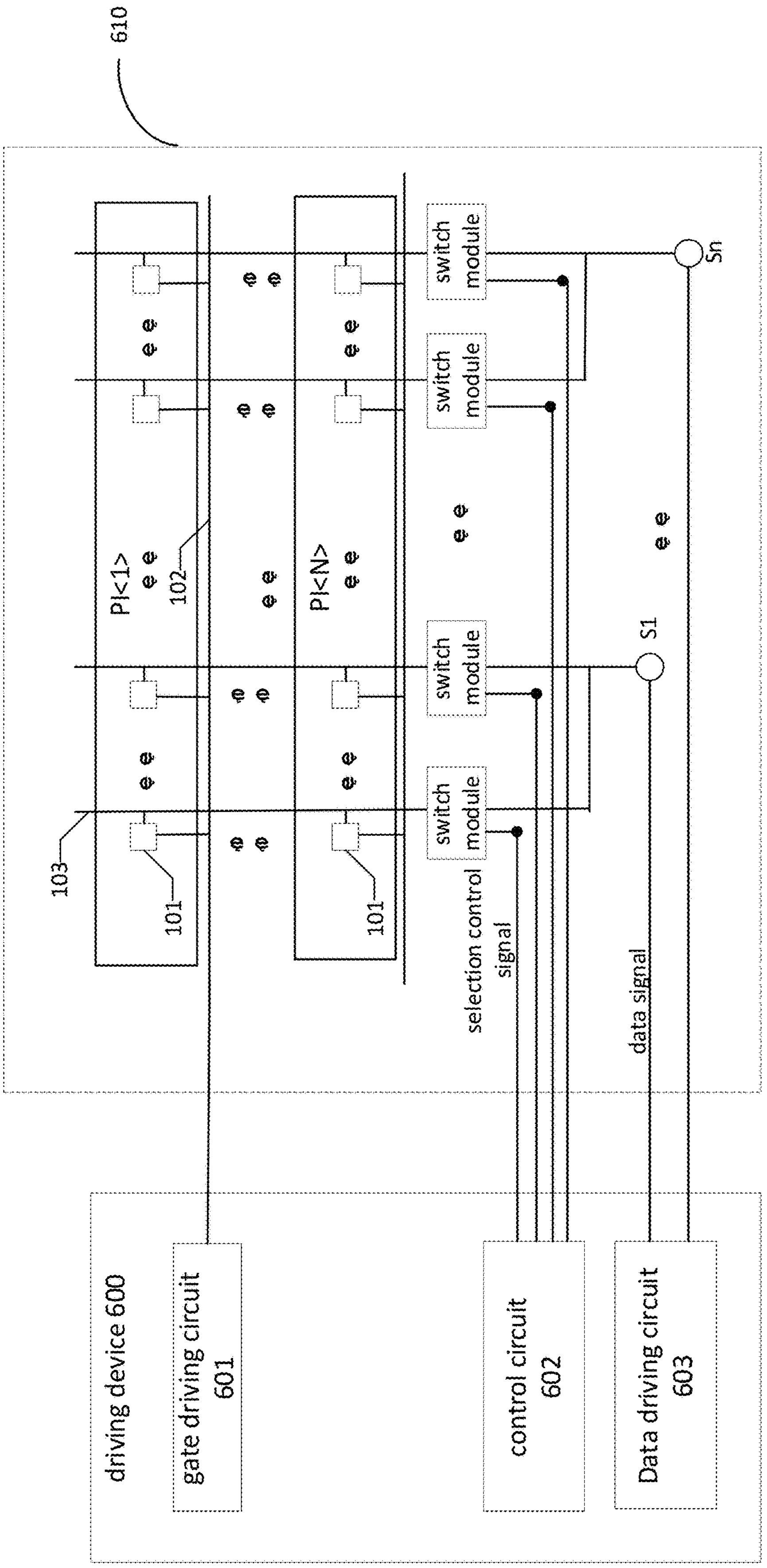
FIG. 6 illustrates a block diagram of a driving device provided by at least one embodiment of the present disclosure.

FIG. 6 illustrates a block diagram of a driving device provided by at least one embodiment of the present disclosure.

As illustrated in FIG. 6, the driving device 600 may include a gate driving circuit 601, a control circuit 602, and a data driving circuit 603.

As illustrated in FIG. 6, the driving device 600 is connected with the pixel array 610, which may be, for example, the pixel array illustrated in FIG. 1A.

The gate driving circuit 601 is configured to apply gate signals to a gate line corresponding to the first row of sub-pixels and a gate line corresponding to the second row of sub-pixels, respectively, and the gate signal comprises an on-state and an off-state. For example, the gate driving circuit may be the gate driving circuit 10 and the gate driving circuit 30 in FIG. 3. For the description of the gate driving circuit, reference can be made to the relevant description of the gate driving circuit 10 and the gate driving circuit 30.

The control circuit 602 is configured to apply selection control signals to the second row of sub-pixels. During a period of applying the gate signals to the second row of sub-pixels to control the second row of sub-pixels, after a first duration length of the gate signals applied to the first row of sub-pixels being switched from the on-state to the off-state, the selection control signals corresponding to the second row of sub-pixels control the switch modules to switch the connection states. The first duration length is greater than 0.

The data driving circuit 603 includes data signal terminals, and the data driving circuit 603 is configured to provide data signals to data lines connected to the data signal terminals. It should be understood that the amount of connecting lines in FIG. 6 does not represent the real amount, and FIG. 6 only schematically represents the connection relationship between the driving device 600 and the pixel array 610, which does not limit the disclosure.

The following should be noted.

(1) Only the structures involved in the embodiments of the present disclosure are illustrated in the drawings of the embodiments of the present disclosure, and other structures can refer to usual designs.

(2) The embodiments and features in the embodiments of the present disclosure may be combined in case of no conflict to obtain new embodiments.

What have been described above merely are exemplary embodiments of the present disclosure, and not intended to define the scope of the present disclosure, and the scope of the present disclosure is determined by the appended claims.

What is claimed is:

1. A method for driving a pixel array, wherein the pixel array comprises sub-pixels in a plurality of rows and columns, a plurality of gate lines and a plurality of data lines intersect to define the sub-pixels in the plurality of rows and columns, the data lines electrically connected to the sub-pixels are electrically connected with data signal terminals through switch modules, respectively, and the switch modules receive selection control signals to switch connection states of the data lines with the data signal terminals, sub-pixels in the plurality of rows comprise a first row of sub-pixels and a second row of sub-pixels, the first row is adjacent to the second row, and the method comprises:

applying gate signals to a gate line corresponding to the first row of sub-pixels and a gate line corresponding to the second row of sub-pixels, respectively, the gate signals comprising an on-state and an off-state; and during a period of applying the gate signals to the second row of sub-pixels to control the second row of sub-pixels, after a first duration length of the gate signals applied to the first row of sub-pixels being switched from the on-state to the off-state, a selection control signal corresponding to the second row of sub-pixels controlling the switch modules to switch the connection states, wherein the first duration length is greater than 0;

wherein each row of sub-pixels is divided into a plurality of sub-pixel groups, a plurality of data lines electrically connected with a plurality of sub-pixels in each sub-pixel group are electrically connected with one data signal terminal through switch modules, respectively, and a switch module corresponding to each sub-pixel comprises a plurality of switching elements, the selection control signals received by the switch module comprise a plurality of selection control signals, and the plurality of switching elements receive the plurality of selection control signals, respectively, so as to switch connection states of the plurality of data lines correspondingly connected with the plurality of switching elements and the data signal terminal;

wherein each sub-pixel group comprises a first sub-pixel and a second sub-pixel, a data line connected with the first sub-pixel is connected with the data signal terminal through a first switching element, and a data line connected with the second sub-pixel is connected with the data signal terminal through a second switching element, the plurality of selection control signals comprise a first selection control signal and a second selection control signal; and during the period of applying the gate signals to the second row of sub-pixels to control the second row of sub-pixels, the first selection control signal and the second selection control signal are applied to the first switching element and the second switching element corresponding to each sub-pixel group in the second row of sub-pixels, respectively, so that the first switching element and the second switching element are turned on.

2. The method according to claim 1, wherein there is a second duration length between a moment of the first selection control signal controlling the first switching element to switch from turn-on to turn-off and a moment of the second selection control signal controlling the second switching element to turn on, and the second duration length is greater than 0.

3. The method according to claim 1, wherein two sub-pixels separated by one column of sub-pixel in each row of sub-pixels are designated as the first sub-pixel and the second sub-pixel, respectively, so that the first sub-pixel and the second sub-pixel form one sub-pixel group.

4. The method according to claim 2, wherein a value range of a ratio of the first duration length to the second duration length is [0.8, 3.0].

5. The method according to claim 2, wherein the second duration length is determined according to a duration length required for the data signal terminal to switch from a first data signal to a second data signal, a duration length required for the first switching element to switch from turn-on to turn-off, and a duration length required for the second switching element to switch from turn-off to turn-on.

6. The method according to claim 2, wherein each sub-pixel group comprises N sub-pixels, and N is an integer greater than or equal to 2, the gate signals are periodic signals, and the switch modules are controlled to switch the connection states by the selection control signals corresponding to the second row of sub-pixels within a third duration length during which the gate signals are in the on-state in each cycle, and a formula for calculating a pulse width of the selection control signal is:

$$W=(T3-T1-(N-1)\times T2)/N,$$

where W represents the pulse width, T3 represents the third duration length, T1 represents the first duration length, and T2 represents the second duration length.

7. The method according to claim 6, wherein a value range of a ratio of the third duration length T3 to the first duration length T1 is [1.0, 5.0].

8. The method according to claim 6, wherein a value range of a ratio of the second duration length T2 to the pulse width is [0.3, 2.0].

9. The method according to claim 6, wherein a value range of a ratio of the first duration length T1 to the pulse width is [0.7, 3.0].

10. The method according to claim 1, wherein the first duration length is positively related to a length of a connecting line of the first row of sub-pixels, and the connecting line is configured to connect a signal source of the gate signals with a receiving terminal of the gate line corresponding to each row of sub-pixels.

11. The method according to claim 10, further comprising:

determining the first duration length corresponding to a longest connecting line among a plurality of connecting lines of the first row of sub-pixels; and according to the first duration length corresponding to the longest connecting line, determining first duration lengths corresponding to other connecting lines except the longest connecting line among the plurality of connecting lines.

12. The method according to claim 11, further comprising:

dividing the pixel array into a plurality of areas, wherein each area comprises a plurality of consecutive rows of sub-pixels, wherein determining the first duration length corresponding to the longest connecting line among the plurality of connecting lines of the first row of sub-pixels comprises:

determining a far-end area farthest from the signal source of the gate signals from the plurality of areas; and determining the first duration length corresponding to the longest connecting line based on the connecting lines corresponding to the first row of sub-pixels in the far-end area; and according to the first duration length corresponding to the longest connecting line, determining the first duration lengths corresponding to other connecting lines except the longest connecting line among the plurality of connecting lines comprises:

according to the first duration length corresponding to the longest connecting line, determining one first duration length for the plurality rows of sub-pixels in each area.

13. A display panel, wherein the display panel comprises a pixel array formed by sub-pixels in a plurality of rows and columns, a plurality of gate lines and a plurality of data lines intersect to define the sub-pixels in the plurality of rows and columns, the data lines electrically connected to the sub-pixels are electrically connected with data signal terminals through switch modules, and the switch modules receive selection control signals to switch connection states of the data lines with the data signal terminals, sub-pixels in the plurality of rows comprise a first row of sub-pixels and a second row of sub-pixels, the first row is adjacent to the second row, and the first row of sub-pixels and the second row of sub-pixels receive gate signals from a gate line corresponding the first row of sub-pixels and a gate line corresponding to the second row of sub-pixels, respectively, and the gate signals comprises an on-state and an off-state; and during a period of applying the gate signals to the second row of sub-pixels to control the second row of sub-pixels, after a first duration length of the gate signals received by the first row of sub-pixels switching from the on-state to the off-state, the switch modules of the second row of sub-pixels receive a selection control signal to control the switch modules of the second row of sub-pixels to switch the connection states;

wherein each row of sub-pixels is divided into a plurality of sub-pixel groups, a plurality of data lines electrically connected with a plurality of sub-pixels in each sub-pixel group are electrically connected with one data signal terminal through switch modules, respectively, and a switch module corresponding to each sub-pixel comprises a plurality of switching elements, the selection control signals received by the switch module comprise a plurality of selection control signals, and the plurality of switching elements receive the plurality of selection control signals, respectively, so as to switch connection states of the plurality of data lines correspondingly connected with the plurality of switching elements and the data signal terminal;

wherein each sub-pixel group comprises a first sub-pixel and a second sub-pixel, a data line connected with the first sub-pixel is connected with the data signal terminal through a first switching element, and a data line connected with the second sub-pixel is connected with the data signal terminal through a second switching element, and the plurality of selection control signals comprise a first selection control signal and a second selection control signal; and during the period of the second row of sub-pixels receiving the gate signals, the first switching element and the second switching element corresponding to each sub-pixel group in the second row of sub-pixels are turned on in response to the first selection control signal and the second selection control signal, respectively.

14. The display panel according to claim 13, wherein there is a second duration length between a moment when the first switching element is switched from turn-on to turn-off and a moment when the second switching element is turned on, and the second duration length is greater than 0.

15. The display panel according to claim 13, wherein the display panel comprises a non-display area and a display area, the pixel array is in the display area, and the non-display area comprises a signal source of the gate signals.

16. A pixel array driving device, wherein the pixel array comprises sub-pixels in a plurality of rows and columns, a plurality of gate lines and a plurality of data lines intersect to define the sub-pixels in the plurality of rows and columns, the data lines electrically connected to the sub-pixels are electrically connected with data signal terminals through switch modules, respectively, and the switch modules receive selection control signals to switch connection states of the data lines with the data signal terminals, sub-pixels in the plurality of rows comprise a first row of sub-pixels and a second row of sub-pixels, the first row is adjacent to the second row, and the driving device comprises:

a gate driving circuit, configured to apply gate signals to a gate line corresponding to the first row of sub-pixels and a gate line corresponding to the second row of sub-pixels, respectively, the gate signals comprising an on-state and an off-state;

a control circuit, configured to apply selection control signals to the second row of sub-pixels, wherein during a period of applying the gate signals to the second row of sub-pixels to control the second row of sub-pixels, after a first duration length of the gate signals applied to the first row of sub-pixels being switched from the on-state to the off-state, a selection control signal corresponding to the second row of sub-pixels controls the switch modules to switch the connection states; and a data driving circuit, comprising the data signal terminals, configured to provide data signals to the data lines connected to the data signal terminals, wherein the first duration length is greater than 0;

wherein each row of sub-pixels is divided into a plurality of sub-pixel groups, a plurality of data lines electrically connected with a plurality of sub-pixels in each sub-pixel group are electrically connected with one data signal terminal through switch modules, respectively, and a switch module corresponding to each sub-pixel comprises a plurality of switching elements, the selection control signals received by the switch module comprise a plurality of selection control signals, and the plurality of switching elements receive the plurality of selection control signals, respectively, so as to switch connection states of the plurality of data lines correspondingly connected with the plurality of switching elements and the data signal terminal;

wherein each sub-pixel group comprises a first sub-pixel and a second sub-pixel, a data line connected with the first sub-pixel is connected with the data signal terminal through a first switching element, and a data line connected with the second sub-pixel is connected with the data signal terminal through a second switching element, the plurality of selection control signals comprise a first selection control signal and a second selection control signal; and during the period of applying the gate signals to the second row of sub-pixels to control the second row of sub-pixels, the first selection control signal and the second selection control signal are applied to the first switching element and the second switching element corresponding to each sub-pixel group in the second row of sub-pixels, respectively, so that the first switching element and the second switching element are turned on.

* * * * *